United States Patent
Choi et al.

(10) Patent No.: US 9,052,769 B2
(45) Date of Patent: Jun. 9, 2015

(54) MOBILE TERMINAL HAVING A FLEXIBLE DISPLAY AND OPERATION METHOD THEREOF

(75) Inventors: Kil Soo Choi, Seoul (KR); Nam Yong Park, Seoul (KR); Kwang Suh Jung, Seoul (KR); Sung Won Jung, Seoul (KR); Kyung Ju Lee, Seoul (KR); Yeong Seok Kim, Seoul (KR); Byung Eun Bong, Seoul (KR); Kyoung Jin Seo, Seoul (KR); Jong Hwan Kim, Seoul (KR); Dae Hyun Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1101 days.

(21) Appl. No.: 12/465,420

(22) Filed: May 13, 2009

(65) Prior Publication Data

US 2010/0060548 A1  Mar. 11, 2010

(30) Foreign Application Priority Data

Sep. 9, 2008  (KR) .................. 10-2008-0088903

(51) Int. Cl.
  *G09G 5/00* (2006.01)
  *G06F 3/041* (2006.01)
  *G06F 3/0481* (2013.01)

(52) U.S. Cl.
  CPC ............ *G06F 3/0414* (2013.01); *G06F 3/0481* (2013.01)

(58) Field of Classification Search
  USPC .......................................................... 345/1
  See application file for complete search history.

(56) References Cited

U.S. PATENT DOCUMENTS

| | | | |
|---|---|---|---|
| 2002/0109662 A1 | 8/2002 | Miller | |
| 2004/0008191 A1* | 1/2004 | Poupyrev et al. | 345/184 |
| 2005/0125217 A1* | 6/2005 | Mazor | 704/1 |
| 2005/0140574 A1* | 6/2005 | Tamura | 345/9 |
| 2005/0140646 A1* | 6/2005 | Nozawa | 345/156 |
| 2006/0274036 A1* | 12/2006 | Hioki et al. | 345/156 |
| 2009/0060452 A1* | 3/2009 | Chaudhri | 386/95 |
| 2009/0089665 A1* | 4/2009 | White et al. | 715/257 |
| 2009/0322690 A1* | 12/2009 | Hiltunen et al. | 345/173 |
| 2009/0326938 A1* | 12/2009 | Marila et al. | 704/235 |

FOREIGN PATENT DOCUMENTS

| | | | |
|---|---|---|---|
| EP | 1 050 794 A2 | 11/2000 | |
| EP | 1 811 750 A1 | 7/2007 | |

(Continued)

*Primary Examiner* — Alexander S Beck
*Assistant Examiner* — Kirk Hermann
(74) *Attorney, Agent, or Firm* — Birch, Stewart, Kolasch & Birch, LLP

(57) ABSTRACT

A mobile terminal and an operating method thereof are provided. The operating method includes providing a transparent flexible display having a first display region at the front of the transparent flexible display and a second display region at the rear of the transparent flexible display; displaying an image in the first display region; determining whether a bend signal indicating that the transparent flexible display is bent is detected; and if the results of the determining indicate that a portion of the second display region has the same display direction as that of the first display region, displaying information regarding the image in the portion of the second display region having the same display direction as that of the first display region. Therefore, it is possible to display various information not only using a display region at the front of a display device but also using a display region at the rear of the display device.

11 Claims, 26 Drawing Sheets

(56) References Cited

FOREIGN PATENT DOCUMENTS

| JP | 2002-278515 | A | 9/2002 |
| JP | 2004-46792 | A | 2/2004 |
| KR | 10-2003-0078783 | A | 10/2003 |
| KR | 10-2005-0056901 | A | 6/2005 |
| KR | 10-2008-0073225 | A | 8/2008 |
| WO | WO 02/089102 | A1 | 11/2002 |

* cited by examiner

FIG.15
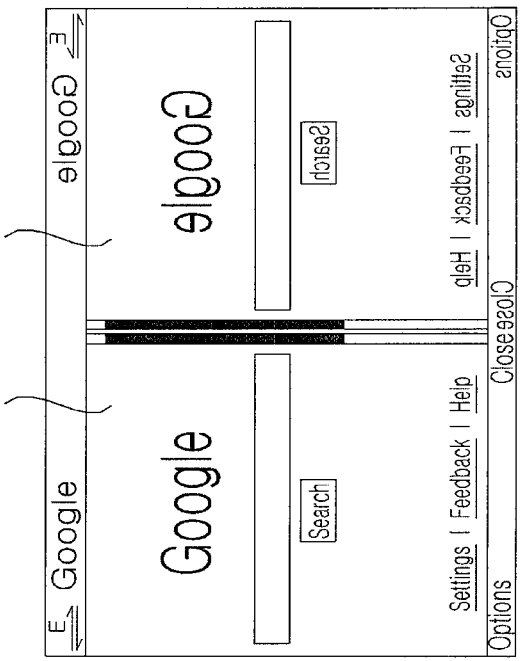
(a)
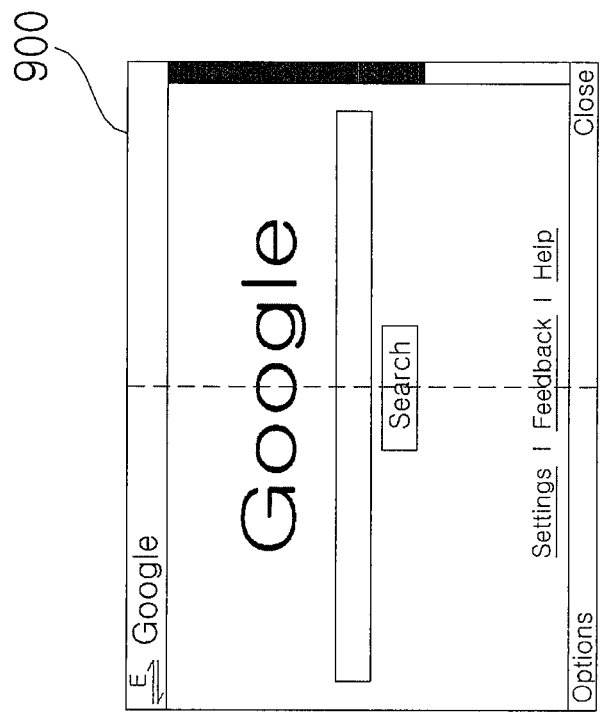
(b)

FIG. 17
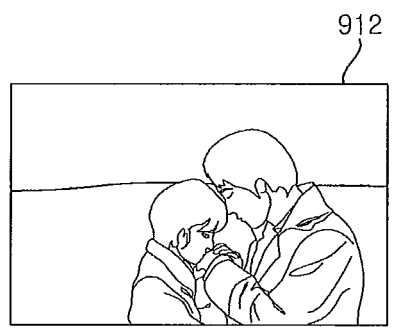
(a)
(b)

MOBILE TERMINAL HAVING A FLEXIBLE DISPLAY AND OPERATION METHOD THEREOF

CROSS-REFERENCE TO RELATED APPLICATION

This application claims the benefit of Korean Application No. 2008-0088903, filed Sep. 9, 2008 in the Korean Intellectual Property Office, the disclosure of which is incorporated herein by reference.

BACKGROUND OF THE INVENTION

1. Field of the Invention

The present invention relates to a mobile terminal and an operating method of the mobile terminal, and more particularly, to a mobile terminal including a transparent, flexible display and an operating method of the mobile terminal, in which a screen effect applied to a display region on the flexible display can be effectively controlled according to whether the flexible display is folded or bent.

2. Description of the Related Art

A mobile terminal is a portable device equipped with one or more of functions for performing voice and video communications, inputting and outputting information, storing data and so on while being carried with.

In order to implement the complicated functions, a variety of attempts have been made to the mobile terminal, implemented in the form of a multimedia player, in terms of hardware or software. Mobile terminals equipped with a flexible display or a transparent display have also been developed.

A flexible display, unlike a typical flat panel display, can be folded, bent or rolled like a scroll. A transparent display may be fabricated using a transparent substrate and a plurality of transparent elements. When an object is displayed in a display region on a surface of a transparent display, an object obtained by reversing the object displayed in the display region left to right may be displayed in another display region on the other surface of the transparent display. A transparent display may be able to display both transparent images and opaque images.

Therefore, in order to realize a transparent, flexible display, it is necessary to develop ways to effectively utilize two display regions on the opposite surfaces of a flexible display in consideration of whether the flexible display is folded or bent.

SUMMARY OF THE INVENTION

The present invention provides a mobile terminal including a transparent, flexible display and an operating method of the mobile terminal, in which a screen effect applied to a display region on the flexible display can be effectively controlled according to whether the flexible display is folded or bent.

According to an aspect of the present invention, there is provided an operating method of a mobile terminal, the operating method including providing a transparent flexible display having a first display region at the front of the transparent flexible display and a second display region at the rear of the transparent flexible display; displaying an image in the first display region; and if an image reverse menu is chosen, dividing the first display region into first and second regions, displaying the image in the first region, and displaying a reversed image obtained by the image left to right in the second display region.

According to another aspect of the present invention, there is provided an operating method of a mobile terminal, the operating method including providing a transparent flexible display having a first display region at the front of the transparent flexible display and a second display region at the rear of the transparent flexible display; displaying a moving image play screen in the first display region; determining whether a bend signal indicating that the transparent flexible display is bent is detected; and if the results of the determining indicate that a portion of the second display region has the same display direction as that of the first display region, displaying subtitles corresponding to the moving image play screen in the portion of the second display region having the same display direction as that of the first display region.

According to another aspect of the present invention, there is provided an operating method of a mobile terminal, the operating method including providing a transparent flexible display having a first display region at the front of the transparent flexible display and a second display region at the rear of the transparent flexible display; displaying an image in the first display region; determining whether a bend signal indicating that the transparent flexible display is bent is detected; and if the results of the determining indicate that a portion of the second display region has the same display direction as that of the first display region, displaying information regarding the image in the portion of the second display region having the same display direction as that of the first display region.

According to another aspect of the present invention, there is provided an operating method of a mobile terminal, the operating method including providing a transparent flexible display having a first display region at the front of the transparent flexible display and a second display region at the rear of the transparent flexible display; displaying a string of input words received in response to a user command in the first display region; determining whether a bend signal indicating that the transparent flexible display is bent is detected; if there is a typo in the input word string and the results of the determining indicate that a portion of the second display region has the same display direction as that of the first display region, displaying a recommended word for an input word including the typo in the portion of the second display region having the same display direction as that of the first display region; and if the bend signal is detected for more than a predefined amount of time, replacing the input word including the typo with the recommended word.

According to another aspect of the present invention, there is provided an operating method of a mobile terminal, the operating method including providing a transparent flexible display having a first display region at the front of the transparent flexible display and a second display region at the rear of the transparent flexible display; displaying a plurality of images in the first display region; determining whether a bend signal indicating that the transparent flexible display is bent is detected; if one of the images is chosen and the results of the determining indicate that a portion of the second display region has the same display direction as that of the first display region, displaying information regarding the chosen image in the portion of the second display region having the same display direction as that of the first display region; and if the bend signal is detected for more than a predefined amount of time, opaquing the portion of the second display region having the same display direction as that of the first display region and then displaying the information regarding the chosen image in the portion of the second display region having the same display direction as that of the first display region.

According to another aspect of the present invention, there is provided a mobile terminal including a flexible display configured to be transparent and have a first display region at the front of the flexible display and a second display region at the rear of the flexible display; and a controller configured to display an image in the first display region, wherein, if an image reverse menu is chosen, the controller divides the first display region into first and second regions and displays a reversed image obtained by the image left to right in the second display region.

According to another aspect of the present invention, there is provided a mobile terminal including a flexible display configured to be transparent and have a first display region at the front of the flexible display and a second display region at the rear of the flexible display; and a controller configured to display a moving image play screen in the first display region and to determine whether a bend signal indicating that the flexible display is bent is detected, wherein, if the results of the determining indicate that a portion of the second display region has the same display direction as that of the first display region, the controller displays subtitles corresponding to the moving image play screen in the portion of the second display region having the same display direction as that of the first display region.

According to another aspect of the present invention, there is provided a mobile terminal including a flexible display configured to be transparent and have a first display region at the front of the flexible display and a second display region at the rear of the flexible display; and a controller configured to display an image in the first display region and to determine whether a bend signal indicating that the flexible display is bent is detected, wherein, if the results of the determining indicate that a portion of the second display region has the same display direction as that of the first display region, the controller displays information regarding the image in the portion of the second display region having the same display direction as that of the first display region.

According to another aspect of the present invention, there is provided a mobile terminal including a flexible display configured to be transparent and have a first display region at the front of the flexible display and a second display region at the rear of the flexible display; and a controller configured to display a string of input words received in response to a user command in the first display region and to determine whether a bend signal indicating that the flexible display is bent is detected, wherein, if there is a typo in the input word string and the results of the determining indicate that a portion of the second display region has the same display direction as that of the first display region, the controller displays a recommended word for an input word including the typo in the portion of the second display region having the same display direction as that of the first display region.

According to another aspect of the present invention, there is provided a mobile terminal including a flexible display configured to be transparent and have a first display region at the front of the flexible display and a second display region at the rear of the flexible display; and a controller configured to display a plurality of images in the first display region and to determine whether a bend signal indicating that the flexible display is bent is detected, wherein, if one of the images is chosen and the results of the determining indicate that a portion of the second display region has the same display direction as that of the first display region, the controller displays information regarding the chosen image in the portion of the second display region having the same display direction as that of the first display region.

BRIEF DESCRIPTION OF THE DRAWINGS

The above and other features and advantages of the present invention will become more apparent by describing in detail preferred embodiments thereof with reference to the attached drawings in which:

FIG. 15 illustrates diagrams for explaining the operating method of the first exemplary embodiment;

FIG. 17 illustrates diagrams for explaining the operating method of the third exemplary embodiment;

FIGS. 25 through 27 illustrate diagrams for explaining the operating method of the seventh exemplary embodiment;

FIG. 31 illustrates diagrams for explaining the operating method of the eleventh exemplary embodiment.

DETAILED DESCRIPTION OF THE INVENTION

The present invention will hereinafter be described in detail with reference to the accompanying drawings in which exemplary embodiments of the invention are shown.

Figure 1:
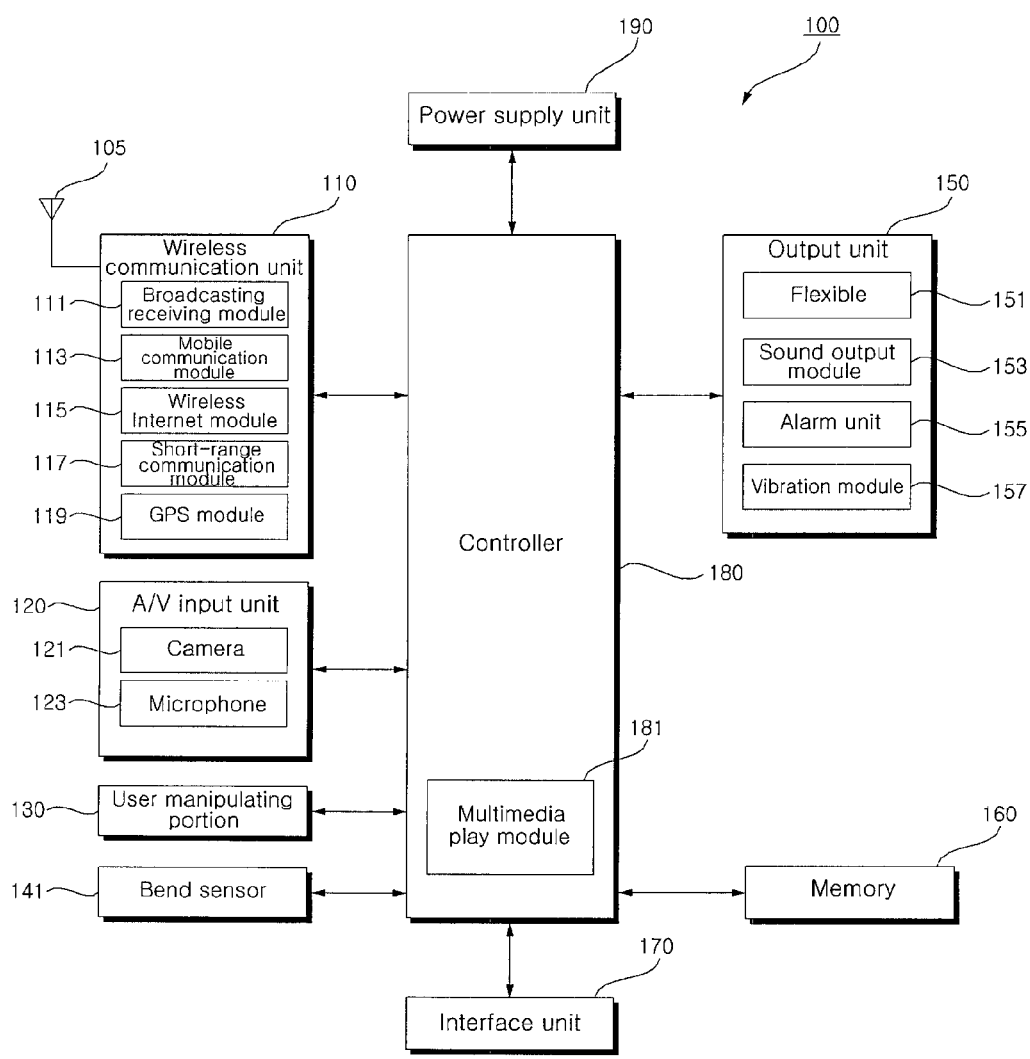
FIG. 1 illustrates a block diagram of a mobile terminal according to an exemplary embodiment of the present invention.

FIG. 1 illustrates a block diagram of a mobile terminal in accordance with an embodiment of the present invention. From a viewpoint of constituent elements according to their functions, the mobile terminal in accordance with an embodiment of the present invention is described with reference to FIG. 1.

Referring to FIG. 1, a mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. When the constituent elements are implemented in actual applications, two or more of the constituent elements may be combined into one constituent element or one constituent element may be divided into two or more constituent elements, if appropriate.

The wireless communication unit 110 may include a broadcasting receiving module 111, a mobile communication module 113, a wireless Internet module 115, a short-range communication module 117, a global positioning system (GPS) module 119 and so on.

The broadcasting receiving module 111 receives at least one of broadcasting signals and broadcasting-associated information from an external broadcasting management server through broadcasting channels. The broadcasting channels may include a satellite channel, a terrestrial wave channel and the like. The broadcasting management server can refer to a server for creating and transmitting at least one of broadcasting signals and broadcasting-associated information or a sever for receiving at least one of previously generated broadcasting signals and previously generated broadcasting-associated information and transmitting it to a terminal.

The broadcasting-associated information can refer to information pertinent to a broadcasting channel, a broadcasting program and/or a broadcasting service provider. The broadcasting signal may include not only TV broadcasting signals, radio broadcasting signals, and data broadcasting signals, but also broadcasting signals in which TV broadcasting signals or radio broadcasting signals are combined with data broadcasting signals. The broadcasting-associated information may be provided over a mobile communication network. The broadcasting-associated information may be received by the mobile communication module 113. The broadcasting-associated information can exist in various forms. For instance, the broadcasting-associated information can exist in the form of the electronic program guide (EPG) of the digital multimedia broadcasting (DMB), the electronic service guide (ESG) of the digital video broadcast-handheld (DVB-H) or the like.

The broadcasting receiving module 111 receives broadcasting signals using various broadcasting systems. In particular, the broadcasting receiving module 111 can receive broadcasting signals using a digital broadcasting system, such as the digital multimedia broadcasting-terrestrial (DMB-T), the digital multimedia broadcasting-satellite (DMB-S), the media forward link only (MediaFLO), the digital video broadcast-handheld (DVB-H), and the integrated services digital broadcast-terrestrial (ISDB-T). The broadcasting receiving module 111 may be constructed to be suitable for not only the digital broadcasting systems, but also the entire broadcasting systems that provide broadcasting signals. At least one of broadcasting signals and/or broadcasting-associated information, which are received through the broadcasting receiving module 111, may be stored in the memory 160.

The mobile communication module 113 transmits and receives radio signals to and from at least one of a base station, an external terminal, and a server over a mobile communication network. Here, the radio signals may include voice call signals, video call signals, or various forms of data according to transmission/reception of text/multimedia messages.

The wireless Internet module 115 refers to a module for wireless Internet access. The wireless Internet module 115 may be built in the mobile terminal 100 or external to the mobile terminal 100. The short-range communication module 117 refers to a module for short-range communication. Local area communication technology can employ Bluetooth, radio frequency identification (RFID), infrared data association (IrDA), ultra wideband (UWB), ZigBee or the like. The GPS module 119 receives position information from a plurality of GPS satellites.

The A/V input unit 120 is adapted to input audio signals or video signals and may include a camera 121, a microphone 123, and so on. The camera 121 processes image frames, such as still images or motion images, which are captured by an image sensor in the video call mode or the capturing mode. The processed image frames may be displayed on a flexible display 151.

Image frames processed by the camera 121 may be stored in the memory 160 or transmitted to the outside through the wireless communication unit 110. A plurality of the cameras 121 may be provided according to the configuration of a terminal.

The microphone 123 receives external sound signals in the call mode, the recording mode, the voice recognition mode, etc. and converts the received sound signals into electrical voice data. In the call mode, the processed voice data may be converted into a format, which may be transmitted to a mobile communication base station through the mobile communication module 113, and then output. The microphone 123 can employ a variety of noise removal algorithms for removing noise occurring in the process of receiving external sound signals.

The user input unit 130 generates key entry data, which is input by a user in order to control the operation of the terminal. The user input unit 130 may include a keypad, a dome switch, a touch pad (static pressure/capacitance), a jog wheel, a jog switch, a finger mouse or the like. If the flexible display 151 forms a layer structure along with a touch pad, the resulting architecture may be referred to as a touch screen.

The sensing unit 140 senses a current status of the mobile terminal 100, such as a closed state of the mobile terminal 100, the position of the mobile terminal 100, whether a user touches the mobile terminal 100 or not, and so on and generates a sensing signal for controlling the operation of the mobile terminal 100. For example, when the mobile terminal 100 is a slide phone type, the sensing unit 140 can sense whether the slide phone is opened or not. The sensing unit 140 may also have the functions of sensing whether the power supply unit 190 supplies power or not, whether the interface unit 170 is connected to an external device, and so on.

The sensing unit 140 may include a bend sensor 141. The bend sensor 141 may convert information indicating the position at which the flexible display 151 is bent or folded into an electric signal. The bend sensor 141 may output different signals for different degrees to the degree to which the flexible display 151 is bent or folded. Therefore, the controller 180 may determine the position at and the degree to which the flexible display 151 is bent or folded based on output data provided by the bend sensor 141. The bend sensor 141 may be placed in contact with the flexible display 151. The bend sensor 141 and the sensing unit 140 may form a layer structure together. In this case, the bend sensors 141 may be uniformly distributed on the flexible display 151.

The output unit 150 is adapted to output audio signals, video signals or alarm signals and may include the flexible display 151, a sound output module 153, an alarm unit 155, a vibration module 157 and so on.

The flexible display 151 refers to a display, which can be folded or bent like paper or rolled like a scroll, unlike a general flat panel display. The flexible display 151 displays and outputs information processed in the mobile terminal 100. For example, when a mobile terminal is in the call mode, the flexible display 151 displays a user interface (UI) or a graphic user interface (GUI), which is pertinent to a call. When the mobile terminal 100 is in a video call mode or a capturing mode, the flexible display 151 can display captured or received images individually or simultaneously and also display a UI or a GUI.

The flexible display 151 may be implemented as a transparent display. In this case, an image displayed in a display region on one surface of the flexible display 151 may appear visible even in a display region on the other surface of the flexible display 151. The two display regions of the flexible display 151 may have opposite display directions. The image displayed in one of the two display regions of the flexible display 151 may appear in the other display region of the flexible display 151 as being reversed left to right.

Meanwhile, in the case in which the flexible display 151 and a touch pad form a layer structure together and thus form a touch screen, as described above, the flexible display 151 may also be used as an input device other than an output device. If the flexible display 151 is constructed of a touch screen, it may include a touch screen panel, a touch screen panel controller and so on. In this case, the touch screen panel is a transparent panel attached to the outside and may be connected to an internal bus within the mobile terminal 100. The touch screen panel continues to monitor whether there is a touch input, and when there is a touch input, sends corresponding signals to the touch screen panel controller. The touch screen panel controller processes the corresponding signals received from the touch screen panel and transmits the corresponding data to the controller 180, so that the controller 180 can understand whether there has been a touch input or which area of the touch screen has been touched.

The flexible display 151 may include at least one of a liquid crystal display, a thin film transistor-liquid crystal display, an organic light-emitting diode, and a three-dimensional (3D) display. The mobile terminal 100 may include two or more flexible displays 151. For example, the mobile terminal 100 may be equipped with both an external display (not shown) and an internal display (not shown).

The sound output module 153 outputs audio data, which is received from the wireless communication unit 110 in the incoming call mode, the call mode, the record mode, the voice recognition mode, the incoming broadcasting mode or the like or stored in the memory 160. The sound output module 153 also outputs sound signals pertinent to the functions performed in the mobile terminal 100, for example, sound of a received call signal and sound of a received message. The sound output module 153 may include a speaker, a buzzer or the like.

The alarm unit 155 outputs signals to inform the occurrence of events in the mobile terminal 100. For example, the events occurring in the mobile terminal 100 may include an incoming call signal, a received message, an entered key signal input and so on. The alarm unit 155 may also output signals to inform the occurrence of events in different ways other than the audio or video signals. For example, the alarm unit 155 may output signals in a vibration form. When a call signal is received or a message is received, the alarm unit 155 may output a signal to inform the reception of the call signal or the message. Alternatively, when a key signal is input, the alarm unit 155 may output a signal as a feedback to the input key signal. A user can notice the occurrence of an event through a signal output by the alarm unit 155. It should be noted that a signal to inform the occurrence of an event might also be output through the flexible display 151 or the sound output module 153.

The memory 160 can store programs necessary to process and control the controller 180 and also function to temporarily store input or output data (for example, a phonebook, messages, still images, motion images and the like).

The memory 160 may include at least one type of storage media, including a flash memory type, a hard disk type, a multimedia card micro type, card type memory (for example, SD memory, XD memory, and so on), RAM, and ROM. The mobile terminal 100 may also manage a web storage serving as the storage function of the memory 160 on an Internet.

The interface unit 170 functions as an interface with all external devices connected to the mobile terminal 100. Examples of the external devices connected to the mobile terminal 100 may include a wired/wireless headset, an external charger, wired/wireless data ports, a memory card, a card socket such as subscriber identification module (SIM)/user identity module (UIM) cards, an audio input/output (I/O) terminal, a video I/O terminal, an earphone, and so on. The interface unit 170 can receive data or may be supplied with power from the external devices, transfer the data or power to respective constituent elements of the mobile terminal 100, and transmit data of the mobile terminal 100 to the external devices.

The controller 180 typically controls the operation of each of the elements and controls an overall operation of the mobile terminal 100. For example, the controller 180 can perform pertinent controls and processes for voice call, data communication, video telephony, and so on. The controller 180 may include a multimedia play module 181 for playing multimedia. The multimedia play module 181 may be constructed in hardware within the controller 180 or constructed in software separately from the controller 180.

The power supply unit 190 is supplied with external power source or internal power source and supplies power source necessary for the operation of the each constituent element under the control of the controller 180.

From a viewpoint of the constituent elements according to their functions, the mobile terminal pertinent to the present invention has been described so far. From a viewpoint of the constituent elements according to their external shapes, the mobile terminal pertinent to the present invention will be hereinafter described with reference to FIGS. 2 and 3. Hereinafter, a bar type mobile terminal equipped with a full touch screen, of several types of mobile terminals such as a folding type, a bar type, a swing type, and a sliding type, is described as an example, for convenience of description. However, it should be understood that the present invention is not limited to the bar type mobile terminal, but instead may be applied to all types of mobile terminals, including the above types.

Figure 2:
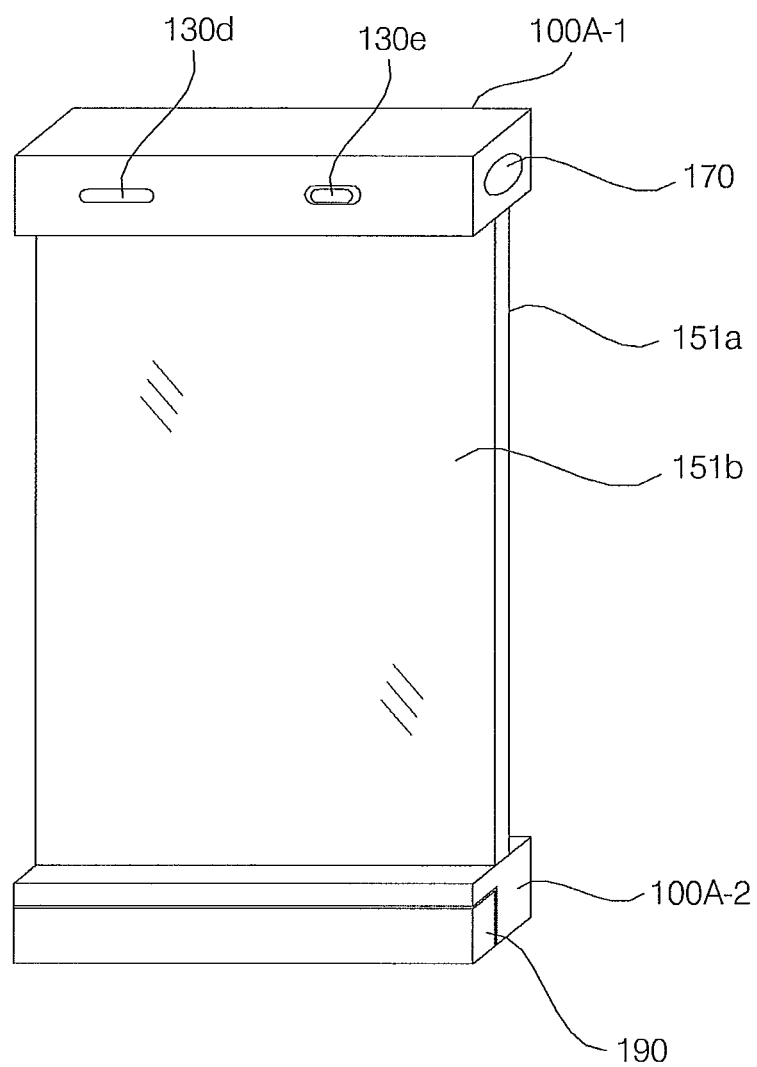
FIG. 2 illustrates a front perspective view of the mobile terminal shown in FIG. 1.
Figure 3:
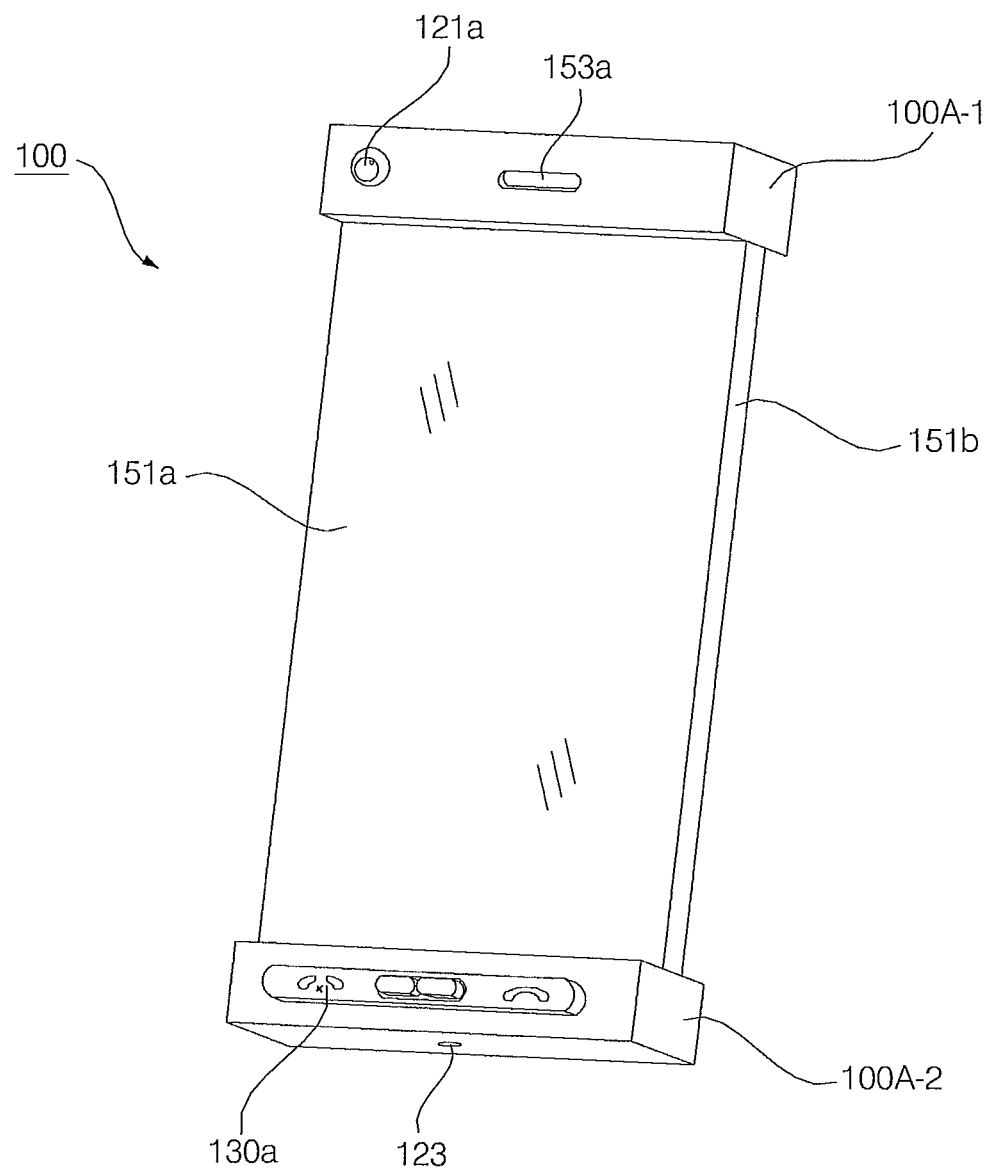
FIG. 3 illustrates a rear perspective view of the mobile terminal shown in FIG. 2.

FIG. 2 illustrates a front perspective view of the mobile terminal 100 shown in FIG. 1, and FIG. 3 illustrates a rear perspective view of the mobile terminal 100 shown in FIG. 2. The structure of the mobile terminal 100 will hereinafter be described, taking a bar-type mobile terminal equipped with a transparent, flexible display as an example. However, the present invention is not restricted to this. That is, the present invention can be applied to nearly all types of mobile terminals.

Referring to FIG. 2, the mobile terminal 100 may include first and second cases 100A-1 and 100A-2. The first and second cases 100A-1 and 100A-2 may form the exterior of the mobile terminal 100. The first and second cases 100A-1 and 100A-2 may be disposed on opposite sides of the flexible display 151 and may support the flexible display 151. Various electronic elements may be disposed in the first and second cases 100A-1 and 100A-2. The first and second cases 100A-1 and 100A-2 may be formed of synthetic resin through molding or may be formed of a metallic material, for example, stainless steel (STS) or titanium (Ti).

A first sound output module 153a and a first camera 121a may be disposed in the main body of the mobile terminal 100, and particularly, in the first case 100A-1. A user input module 130a and the microphone 123 may be disposed in the second case 100A-2. The flexible display 151 may be disposed between the first and second cases 100A-1 and 100A-2. The flexible display 151 may include a first display region 151a in which images are actually displayed. Since the flexible display 151 is transparent, an image displayed in the first display region 151a may appear visible in a second display region 151b of the flexible display 151, which is on the opposite side of the first display region 151a. In this case, the image displayed in the first display region 151a may appear in the second display region 151b as being reversed left to right. The first and second display regions 151a and 151b may have opposite display directions.

The flexible display 151 includes a liquid crystal display (LCD), an organic light-emitting diode (OLED) and the like, which visually display information. The flexible display 151 may be configured in such a manner that a touch pad is overlapped with the flexible display 151 in a layered structure and therefore the flexible display 151 operates as a touch screen, thereby enabling the input of information by a user's touch.

The first sound output module 153a may be implemented in the form of a receiver or speaker. The first camera 121a may be implemented suitably to capture still images or motion images of a user and so on. The microphone 123 may be implemented in such a way as to appropriately receive a user's voice, other sound, etc. The user input module 130a may adopt various data input methods as long as they can offer tactile feedback to a user. For example, the user input module 130a may be implemented as a dome switch or a touch pad which receives a command or information upon being pushed or touched by a user. Alternatively, the user input module 130a may be implemented as a wheel, a jog dial, or a joystick.

The user input module 130a may allow a user to input such commands as 'start', 'end', and 'scroll' and to choose an operating mode and may serve as a hot key for activating certain functions of the mobile terminal 100.

FIG. 3 illustrates a rear perspective view of the mobile terminal 100 shown in FIG. 2. Referring to FIG. 3, a fourth user input module 130d and a fifth user input module 130e may be disposed at the rear of the first case 100A-1, and the interface unit 170 may be disposed on one side of the first case 100A-1.

A second sound output module (not shown) may be disposed in the second case 100A-2. The second sound output module may realize a stereo function together with the first sound output module 153a or may be used to realize a speaker-phone mode.

An antenna (not shown) for receiving a broadcast signal may be disposed on one side of the second case 100A-2. The antenna may be able to be pulled out from the second case 100A-2.

The interface unit 170 becomes a passage through which the mobile terminal 100 can exchange data, etc. with external devices. For example, the interface unit 170 may be at least one of a connector for connecting to an earphone, a port for short-range communications, and power supply terminals for supplying power to the mobile terminal 100, in a wired or wireless manner. The interface unit 170 may be a card socket for accommodating external cards, such as a subscriber identification module (SIM) or a user identity module (UIM), and a memory card for storing information.

The power supply unit 190 for supplying power to the mobile terminal is mounted in a lower part of the second case 100A-2. The power supply unit 190 may be, for example, a rechargeable battery, and may be coupled to the second case 100A-2 so as to be able to be easily attached to or detached from the second case 100A-2.

The flexible display 151 may be transparent. In this case, when an image is displayed in a display region on one surface of the flexible display 151, a reversed image obtained by reversing the image displayed in the display region left to right may be displayed in a display region on the other surface of the flexible display 151 due to the properties of a transparent display. The two display regions of the flexible display 151 will hereinafter be referred to as the first and second display regions 151b. The first display region 151a and the second display region 151b may have opposite display directions.

Figure 4:
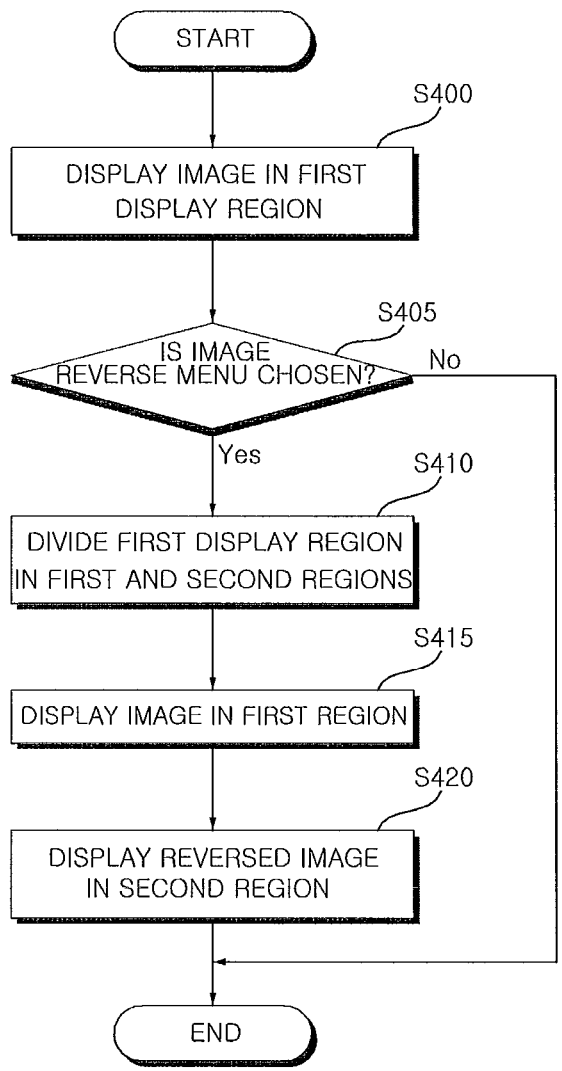
FIG. 4 illustrates a flowchart of an operating method of a mobile terminal according to a first exemplary embodiment of the present invention.

FIG. 4 illustrates a flowchart of an operating method of a mobile terminal according to a first exemplary embodiment of the present invention. Referring to FIG. 4, the controller 180 may display an image in the first display region 151a of the flexible display 151 (S400). Examples of the image include a web page provided by a website, a moving image play screen, and text data.

Thereafter, the controller 180 may determine whether a reverse effect menu has been chosen (S405). The reverse effect menu may allow the image displayed in the first display region 151a to be displayed in the second display region 151b without being reversed left to right. The reverse effect menu may be chosen in response to a signal received by the user input unit 130. Alternatively, if the flexible display 151 is a touch screen, the reverse effect may be chosen in response to a signal received by the touch screen. Still alternatively, the reverse effect menu may be chosen in response to a signal detected by the bend sensor 141. If the reverse effect menu is determined yet to be chosen, the image displayed in the first display region 151a may not be modified.

On the other hand, if the reverse effect menu is determined to have been chosen, the controller 180 may divide the first display region 151a into first and second regions (410). The first and second regions may be upper and lower parts, respectively, of the first display region 151a or vice versa. Alternatively, the first and second regions may be left and right parts, respectively of the first display region 151a or vice versa. The first and second regions may have different sizes. Thereafter, the controller 180 may display the image previously displayed in the entire first display region 151a in the first region (S415). More specifically, the controller 180 may scale down the image previously displayed in the entire first display region 151a in the first region and may display the scaled-down image in the first region. Thereafter, the controller 180 may display a reversed image obtained by reversing the image displayed in the first region left to right in the second region so that the image displayed in the first region can also be displayed in a region of the second display region 151b corresponding to the second region in the first display region 151a (S420). In short, the image displayed in the first display region in operation S400 may be reversed left to right, and the reversed image may be scaled down in operation S420. Thereafter, the scaled-down image may be displayed only in the second region of the first display region 151a.

If the flexible display 151 is a transparent display, an image displayed in the first display region 151a may appear in the second display region 151b as being reversed left to right. Therefore, if an image displayed in the second display region 151b is determined not to be a reversed image, it may be determined that a reversed image has been displayed in the first display region 151a.

Figure 5:
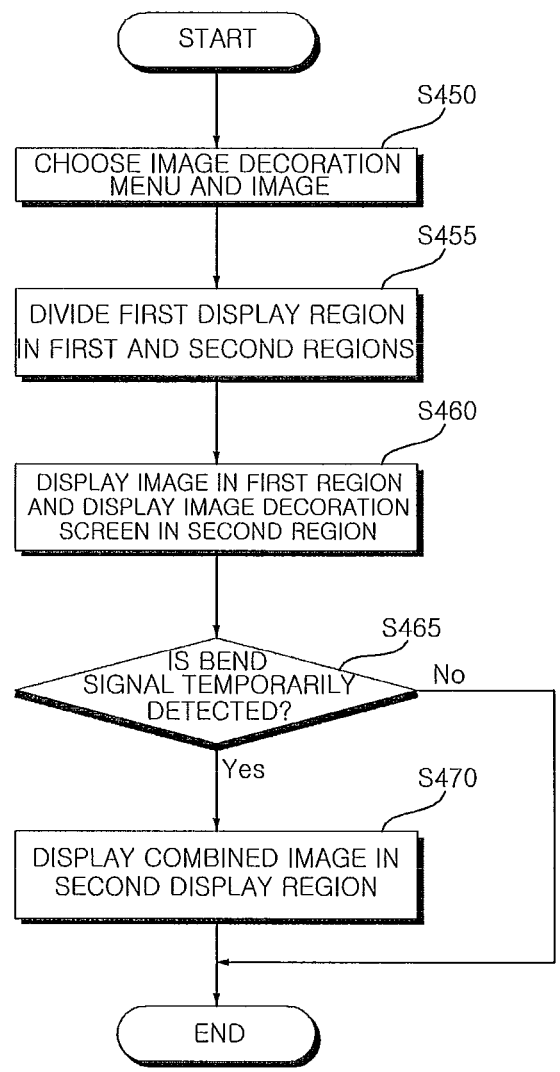
FIG. 5 illustrates a flowchart of an operating method of a mobile terminal according to a second exemplary embodiment of the present invention.

FIG. 5 illustrates a flowchart of an operating method of a mobile terminal according to a second exemplary embodiment of the present invention. Referring to FIG. 5, an image decoration menu may be chosen through the user input unit 130 or a touch screen, and an image to be decorated may be chosen (S450). Examples of the chosen image include text data, a moving image play screen, a photo, a web page, and an image created by a user. The image decoration menu is a menu for decorating an image with frame images, icons, avatars or background images.

Thereafter, the controller 180 may divide the first display region 151a into first and second regions (S455). The first and second regions may have different sizes. Thereafter, the controller 180 may display the chosen image in the first region, and may display an image decoration screen provided by the image decoration menu in the second region (S460).

Thereafter, the controller 180 may determine whether a bend signal is temporarily detected by the bend sensor 141 (S465). If there is no bend signal detected by the bend sensor 141, the operating method ends without modifying the screen image displayed in each of the first and second display regions 151a and 151b.

On the other hand, if a bend signal is detected by the bend sensor 141, the controller 180 may combine the chosen image and the image decoration screen, and may display an image obtained by the combination in the second display region 151b (S470). In this case, a reversed image obtained by reversing the image displayed in the second display region 151b left to right may be displayed in the first display region 151a.

The controller 180 may store the image obtained by the combination performed in operation S470 in the memory 160 in response to a user command.

Figure 6:
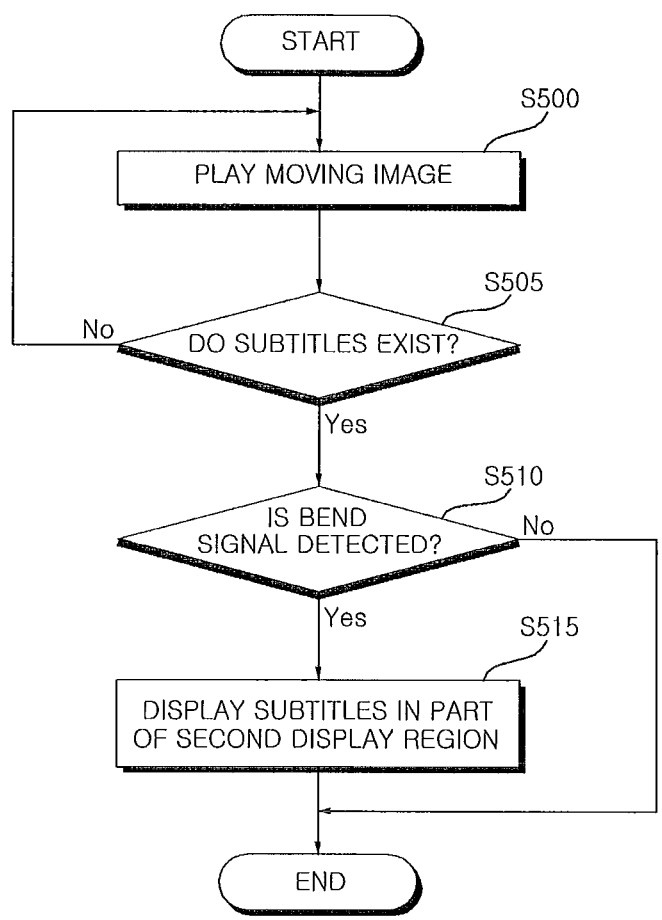
FIG. 6 illustrates a flowchart of an operating method of a mobile terminal according to a third exemplary embodiment of the present invention.

FIG. 6 illustrates a flowchart of an operating method of a mobile terminal according to a third exemplary embodiment of the present invention. Referring to FIG. 6, the controller 180 may play a moving image and may thus display a moving image play screen in the first display region 151a (S500). The moving image may be a moving image present in the memory 160 or a moving image received from an external source as part of a digital multimedia broadcasting (DMB) service. Thereafter, the controller 180 may determine whether subtitle data corresponding to the moving image exists (S505). If no subtitle data corresponding to the moving image exists, the operating method returns to operation S500. On the other hand, if subtitle data corresponding to the moving image exists, the controller 180 may determine whether a bend signal is detected by the bend sensor 141 (S510). If there is no bend signal detected by the bend sensor 141, the operating method ends without modifying the screen image displayed in each of the first and second display regions 151a and 151b.

On the other hand, if a bend signal is detected by the bend sensor 141 and the bend signal indicates that there is a portion of the second display region 151b having the same display direction as that of the first display region 151a, the controller 180 may control the subtitle data corresponding to the moving image to be displayed in the portion of the second display region 151b having the same display direction as that of the first display region 151a (S515). In this manner, it is possible to display the subtitle data corresponding to the moving image without interfering with the display of the moving image in the first display region 151a.

Figure 7:
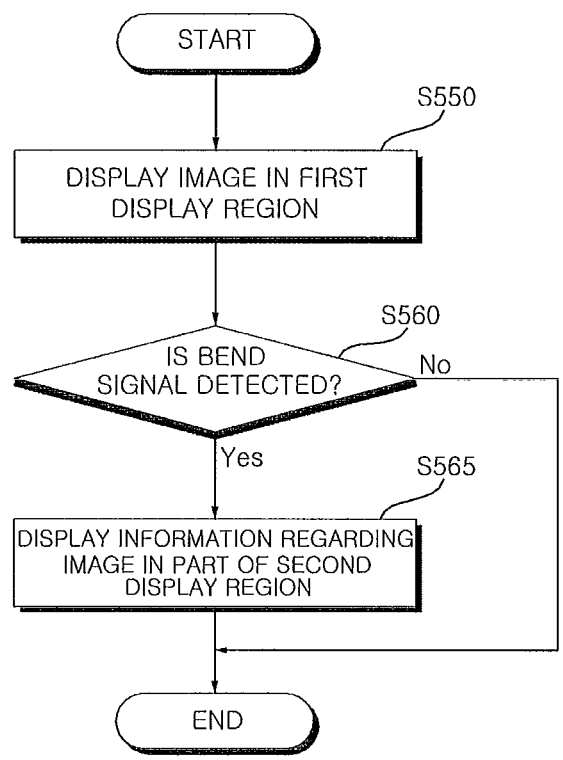
FIG. 7 illustrates a flowchart of an operating method of a mobile terminal according to a fourth exemplary embodiment of the present invention.

FIG. 7 illustrates a flowchart of an operating method of a mobile terminal according to a fourth exemplary embodiment of the present invention. Referring to FIG. 7, the controller 180 may display a predetermined image in the first display region 151a (S550). The predetermined image may be text data, a moving image play screen, a music file play screen, a web page provided by a website and a photo. Alternatively, the predetermined image may be a region chosen in response to a user command or may be part of a screen image displayed in the first display region 151a such as a photo, a note, or an additional description mark displayed in a web page, a footnote to text data or a word chosen by a user.

Thereafter, the controller 180 may determine whether a bend signal is detected by the bend sensor 141 (S560). If there is no bend signal detected by the bend sensor 141, the operating method ends without modifying the screen image displayed in each of the first and second display regions 151a and 151b. On the other hand, if a bend signal is detected by the bend sensor 141 and the bend signal indicates that there is a portion of the second display region 151b having the same display direction as that of the first display region 151a, the controller 180 may control information regarding the image displayed in the first display region 151a to be displayed in the portion of the second display region 151b having the same display direction as that of the first display region 151a (S565). If the image displayed in the first display region 151a is a web page, the information regarding the image displayed in the first display region 151a may be update information or title information of the web page. On the other hand, if the image displayed in the first display region 151a includes a footnote of text data, the information regarding the image displayed in the first display region 151a may be a detailed description of the footnote. The information regarding the image displayed in the first display region 151a may be opaquely displayed in the second display region 151b so as to be clearly distinguished from the image displayed in the first display region 151a.

Therefore, it is possible for a user to view detailed information regarding an image currently being displayed in the first display region 151a from the second display region 151b by bending or folding the flexible display 151.

Figure 8:
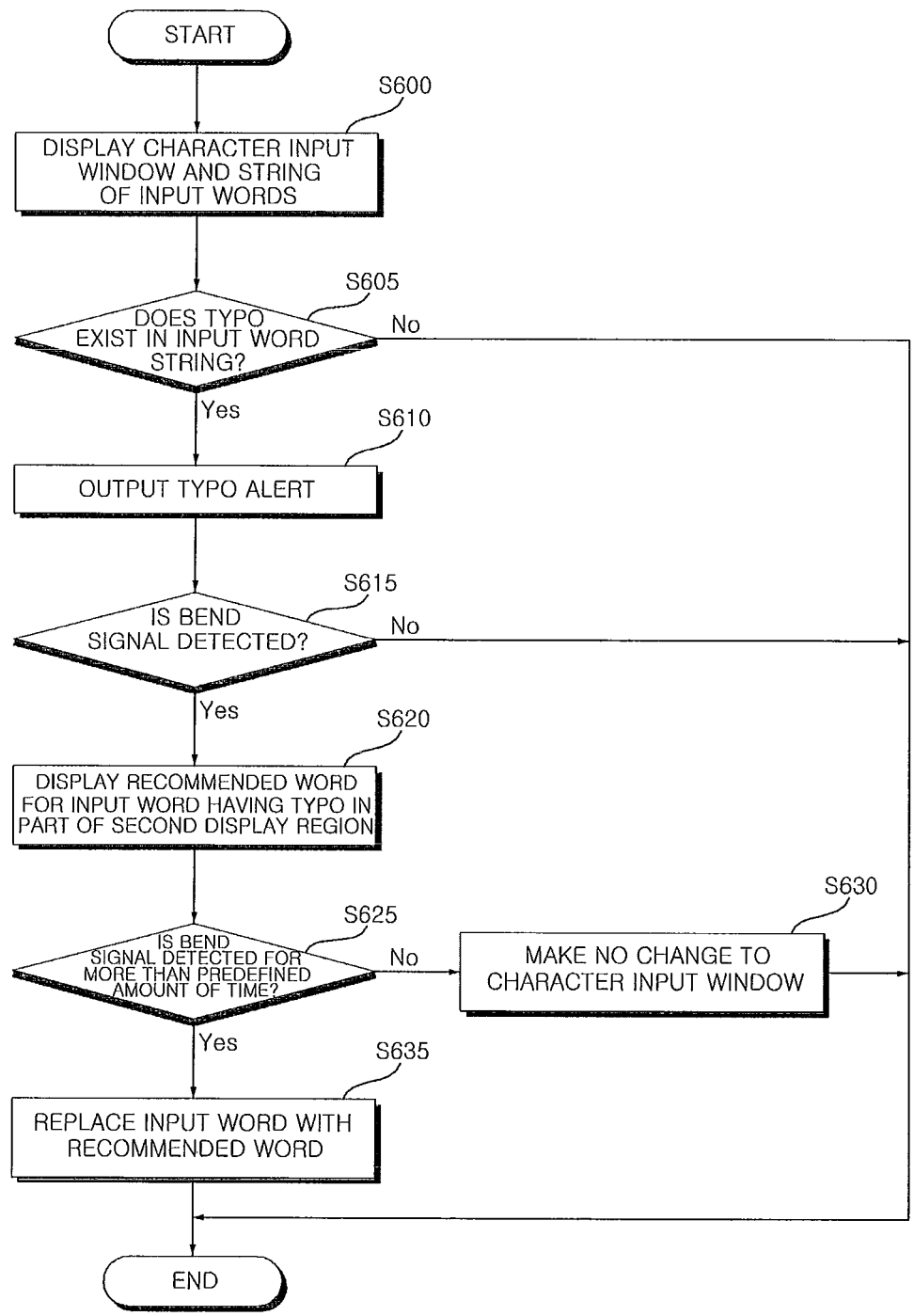
FIG. 8 illustrates a flowchart of an operating method of a mobile terminal according to a fifth exemplary embodiment of the present invention.

FIG. 8 illustrates a flowchart of an operating method of a mobile terminal according to a fifth exemplary embodiment of the present invention. Referring to FIG. 8, the controller 180 may display a character input window in the first display region 151a and may display a string of words input by a user in the character input window (S600). Thereafter, the controller 180 may determine whether there is a typo in the input word string (S605). If there is no typo in the input word string, the operating method ends without modifying the screen image displayed in each of the first and second display regions 151a and 151b.

On the other hand, if there is a typo in the input word string, the controller 180 may output a typo alert (S610). More specifically, the controller 180 may display a typo alert, change the color of the input word having the typo, or underline the input word having the typo.

Thereafter, the controller 180 may determine whether a bend signal is detected by the bend sensor 141 (S615). More specifically, the controller 180 may determine whether the flexible display 151 is folded or bent so that a portion of the second display region 151b can have the same display direction as that of the first display region 151a. If there is no bend signal detected by the bend sensor 141, the operating method ends without modifying the screen image displayed in each of the first and second display regions 151a and 151b.

On the other hand, if a bend signal is detected by the bend sensor 141 and the bend signal indicates that there is a portion of the second display region 151b having the same display direction as that of the first display region 151a, the controller 180 may control a recommended word for the input word having the typo to be displayed in the portion of the second display region 151b having the same display direction as that of the first display region 151a (S620). The recommended word may be opaquely displayed in the second display region 151b so as to be clearly distinguished from the character input window displayed in the first display region 151a.

Thereafter, the controller 180 may determine whether the bend signal is detected for more than a predefined amount of time (S625). The predefined amount of time may be determined by the user. If the bend signal is detected for less than the predefined amount of time, the controller 180 may determine that the second display region 151b does not have the same display direction as that of the first display region 151a any longer because of, for example, the flexible display 151 being unfolded or unbent, and may thus control the character input window and the input word having the typo to be displayed in the first display region 151a (630).

On the other hand, if the bend signal is detected for more than the predefined amount of time, the controller 180 may determine that the flexible display 151 is still folded or bent and may thus replace the input word having the typo with the recommended word (S635).

Figure 9:
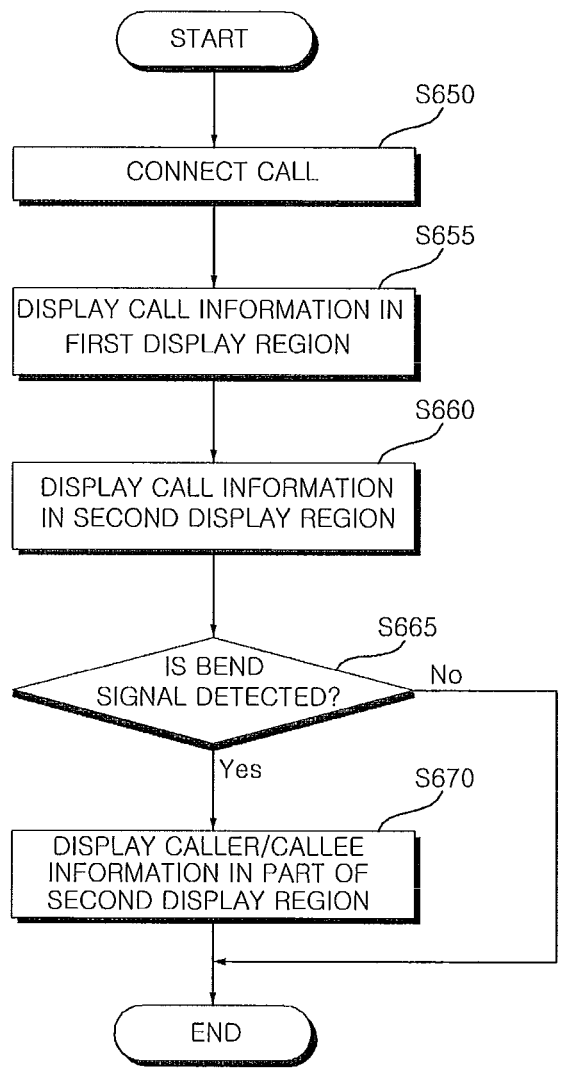
FIG. 9 illustrates a flowchart of an operating method of a mobile terminal according to a sixth exemplary embodiment of the present invention.

FIG. 9 illustrates a flowchart of an operating method of a mobile terminal according to a sixth exemplary embodiment of the present invention. Referring to FIG. 9, the controller 180 may make a call to a person (S650). Thereafter, the controller 180 may display call information regarding the phone conversation with the person in the first display region 151a (S655). Thereafter, the controller 180 may control the call information to be displayed in the second display region 151b without being reversed left to right (S660).

Thereafter, the controller 180 may determine whether a bend signal is detected by the bend sensor 141 (S665). If there is no bend signal detected by the bend sensor 141, the operating method ends without modifying the screen image displayed in each of the first and second display regions 151a and 151b.

If a bend signal is detected by the bend sensor 141 and the bend signal indicates that the flexible display 151 is folded or bent and thus a portion of the second display region 151b has the same display direction as that of the first display region 151a, the controller 180 may control call information regarding the person to be displayed in the portion of the second display region 151b having the same display direction as that of the first display region 151a (S620). For example, the person's photo or email address may be displayed in the portion of the second display region 151b having the same display direction as that of the first display region 151a as the callee information. The callee information may be opaquely displayed in the second display region 151b so as to be clearly distinguished from the call information displayed in the first display region 151a.

Figure 10:
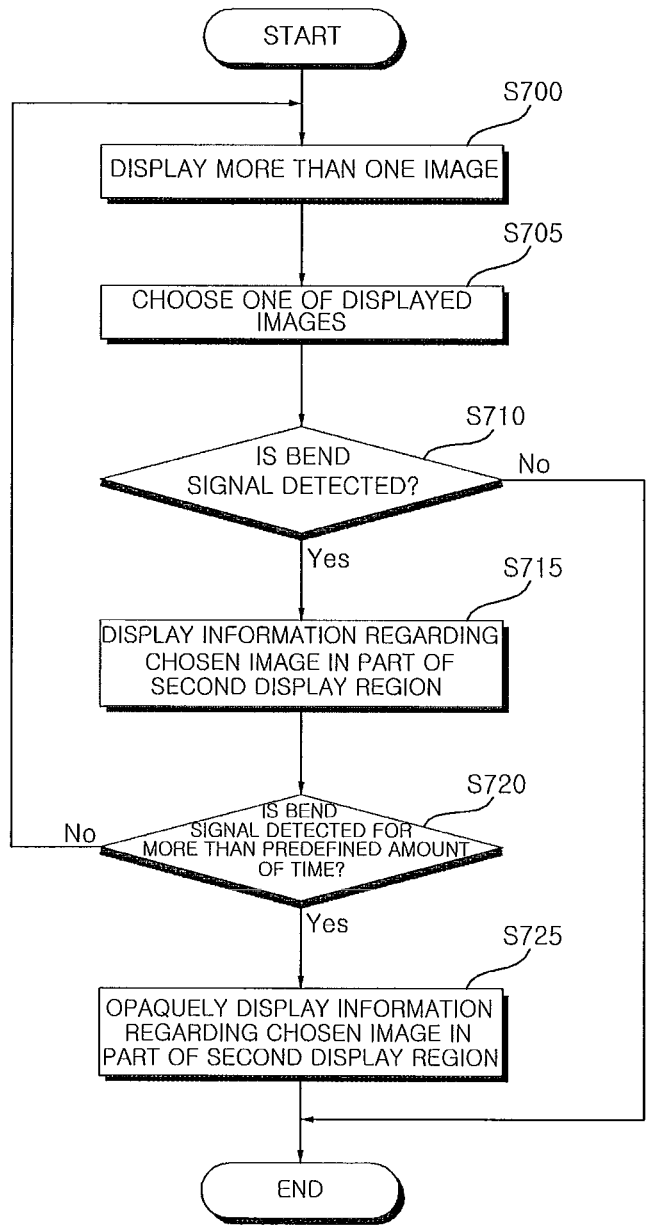
FIG. 10 illustrates a flowchart of an operating method of a mobile terminal according to a seventh exemplary embodiment of the present invention.

FIG. 10 illustrates a flowchart of an operating method of a mobile terminal according to a seventh exemplary embodiment of the present invention. Referring to FIG. 10, the controller 180 may display a plurality of images in the first display region 151a (S700). Examples of the images include text data, ordinary images, calendars, file lists, and text message lists.

Thereafter, if one of the images, for example, a first image, is chosen by a user (S705), the controller 180 may change the color or the shape of the first image and may display the changed first image in the first display region 151a.

Thereafter, the controller 180 may determine whether a bend signal is detected by the bend sensor 141 (S710). If there is no bend signal detected by the bend sensor 141, the operating method ends without modifying the screen image displayed in each of the first and second display regions 151a and 151b.

On the other hand, if a bend signal is detected by the bend sensor 141 and the bend signal indicates that there is a portion of the second display region 151b having the same display direction as that of the first display region 151a, the controller 180 may control information regarding the first image to be displayed in the portion of the second display region 151b having the same display direction as that of the first display region 151a (S715). For example, if a file is chosen from a file list displayed in the first display region 151a and a bend signal, if any, detected by the bend sensor 141 indicates that there is a portion of the second display region 151b having the same display direction as that of the first display region 151a, information regarding the chosen file such as the format of the chosen file and the time of creation of the chosen file may be displayed in the portion of the second display region 151b having the same display direction as that of the first display region 151a. Since the flexible display 151 is transparent, the first image displayed in the first display region 151a may be seen through the information displayed in the second display region 151b regarding the chosen file.

Thereafter, the controller 180 may determine whether the bend signal is detected for more than a predefined amount of time (S720). The predefined amount of time may be determined by the user. If the bend signal is detected for less than the predefined amount of time, the operating method returns to operation S700.

On the other hand, if the bend signal is detected for more than the predefined amount of time, the controller 180 may make the portion of the second display region 151b having the same display direction as that of the first display region 151a opaque and may control the information regarding the first image to be displayed in the opaque portion of the second display region 151b (S725). That is, if the bend signal is detected for more than the predefined amount of time, a portion of the second display region 151b may become opaque, and thus, an image displayed in the first display region 151a may not be seen through information displayed in the portion of the second display region 151b.

Figure 11:
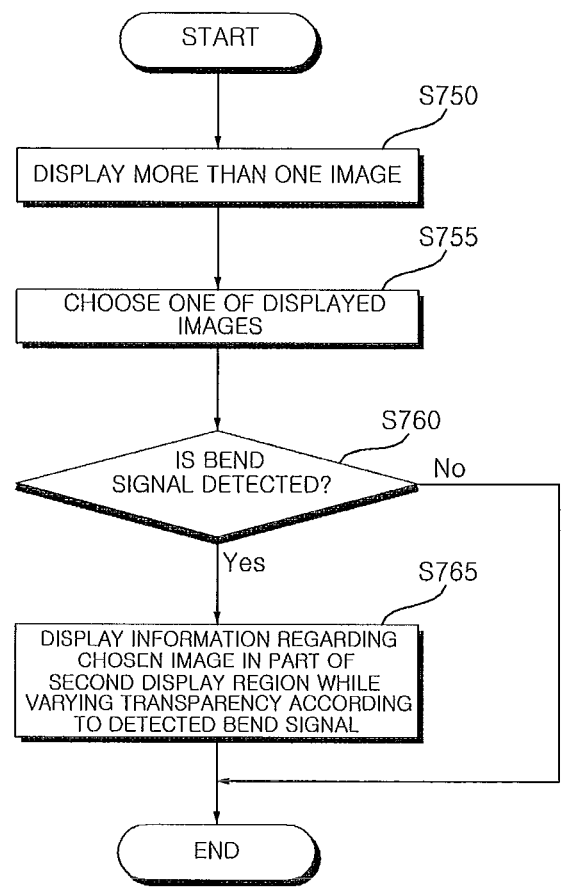
FIG. 11 illustrates a flowchart of an operating method of a mobile terminal according to an eighth exemplary embodiment of the present invention.

FIG. 11 illustrates a flowchart of an operating method of a mobile terminal according to an eighth exemplary embodiment of the present invention. Referring to FIG. 11, the controller 180 may display a plurality of images in the first display region 151a (S750). Examples of the images include text data and ordinary images.

If one of the images, for example, a first image, is chosen by a user (S755), the controller 180 may change the color or the shape of the first image and may display the changed first image in the first display region 151a.

Thereafter, the controller 180 may determine whether a bend signal is detected by the bend sensor 141 (S760). If there is no bend signal detected by the bend sensor 141, the operating method ends without modifying the screen image displayed in each of the first and second display regions 151a and 151b.

On the other hand, if a bend signal is detected by the bend sensor 141 and the bend signal indicates that there is a portion of the second display region 151b having the same display direction as that of the first display region 151a, the controller 180 may change the transparency of the portion of the second display region 151b having the same display direction as that of the first display region 151a, and may display information regarding the first image in the portion of the second display region 151b having the same display direction as that of the first display region 151a (S765). For example, as the area of the portion of the portion of the second display region 151b having the same display direction as that of the first display region 151a increases, the portion of the second display region 151b having the same display direction as that of the first display region 151a may gradually become opaque. In this manner, it is possible to clearly display the information regarding the first image in the second display region 151b. If the area of the portion of the second display region 151b having the same display direction as that of the first display region 151a exceeds a predefined level, the portion of the second display region 151b having the same display direction as that of the first display region 151a may become completely opaque.

Figure 12:
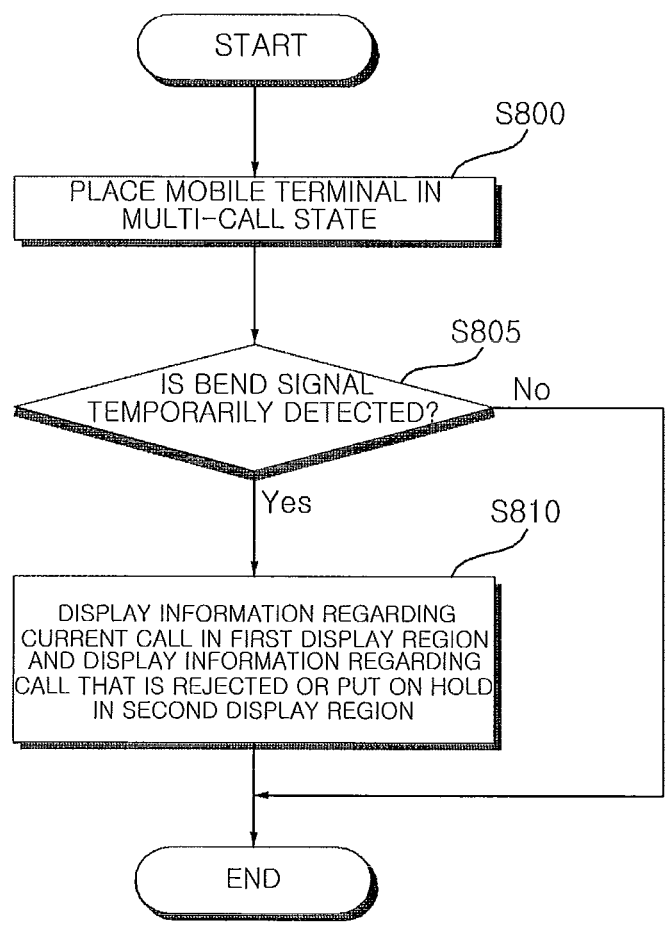
FIG. 12 illustrates a flowchart of an operating method of a mobile terminal according to a ninth exemplary embodiment of the present invention.

FIG. 12 illustrates a flowchart of an operating method of a mobile terminal according to a ninth exemplary embodiment of the present invention. Referring to FIG. 12, the controller 180 may make a call, may reject an incoming call or may put an incoming call on hold the mobile terminal 100 is in a multi-call state. Examples of the multi-call state include a multi-talk state, a call hold state, and a call transfer state. If the mobile terminal 100 is in the multi-call state (S800), the controller 180 may display call information regarding a current call in the first display region 151a.

Thereafter, the controller 180 may determine whether a bend signal is temporarily detected by the bend sensor 141 (S805). If there is no bend signal detected by the bend sensor 141, the operating method ends without modifying the screen image displayed in each of the first and second display regions 151a and 151b.

On the other hand, if a bend signal is temporarily detected by the bend sensor 141 and the bend signal indicates that there is a portion of the second display region 151b having the same display direction as that of the first display region 151a, the controller 180 may control the information regarding the current call to be displayed in the first display region 151a and may control information regarding a call rejected or put on hold to be displayed in the portion of the second display region 151b having the same display direction as that of the first display region 151a (S810). The information regarding the current call may include the name of a caller or callee, the photo of the caller or the callee, or the time and duration of the current call. The information regarding a call rejected or put on hold may include the name of a caller, the photo of the caller, or the time at which the call was rejected or put on hold.

Figure 13:
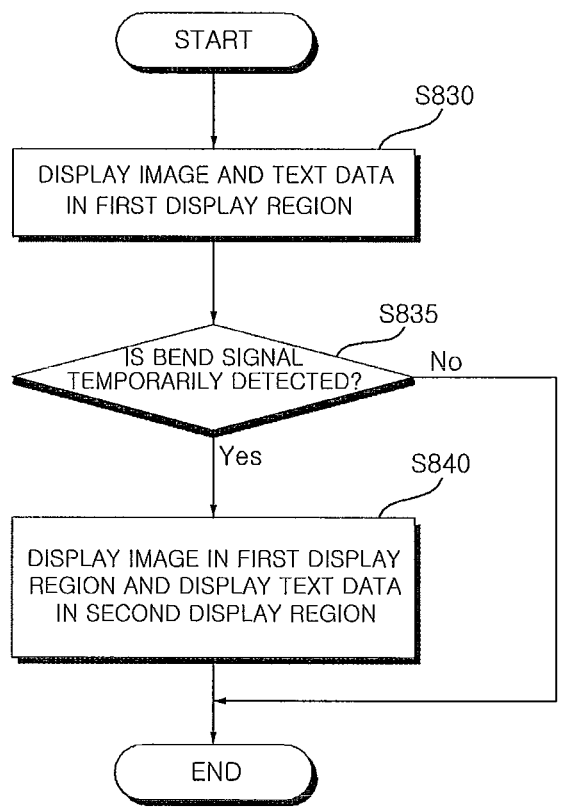
FIG. 13 illustrates a flowchart of an operating method of a mobile terminal according to a tenth exemplary embodiment of the present invention.

FIG. 13 illustrates a flowchart of an operating method of a mobile terminal according to a tenth exemplary embodiment of the present invention. Referring to FIG. 13, the controller 180 may display an image and text data regarding the image in the first display region 151a (S830). The text data regarding the image may include a description of the image, the title of the image and the time of creation of the image.

Thereafter, the controller 180 may determine whether a bend signal is temporarily detected by the bend sensor 141 (S835). If there is no bend signal detected by the bend sensor 141, the operating method ends without modifying the screen image displayed in each of the first and second display regions 151a and 151b.

On the other hand, if a bend signal is temporarily detected by the bend sensor 141 and the bend signal indicates that there is a portion of the second display region 151b having the same display direction as that of the first display region 151a, the controller 180 may control the image to be displayed in the first display region 151a and may control the text data regarding the image to be displayed in the portion of the second display region 151b having the same display direction as that of the first display region 151a (S840).

Figure 14:
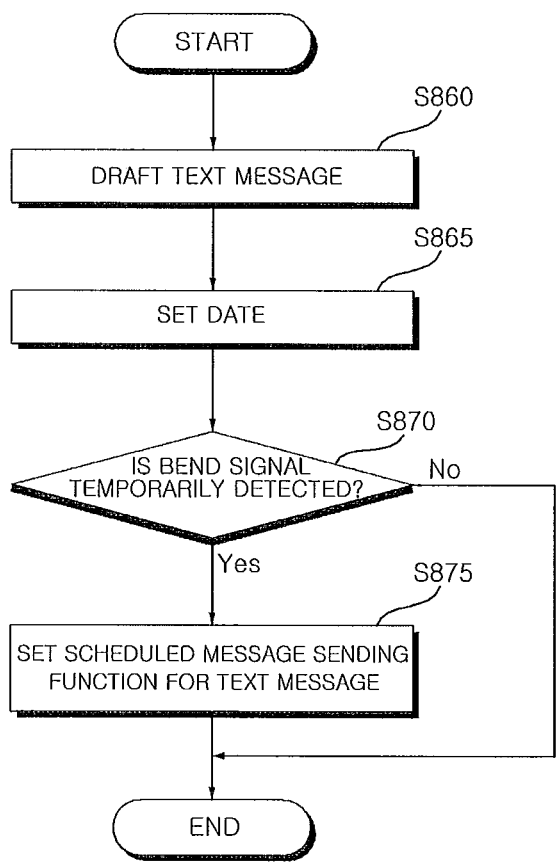
FIG. 14 illustrates a flowchart of an operating method of a mobile terminal according to an eleventh exemplary embodiment of the present invention.

FIG. 14 illustrates a flowchart of an operating method of a mobile terminal according to an eleventh exemplary embodiment of the present invention. Referring to FIG. 14, the controller 180 may draft a text message in response to a user command and may display the text message in the first display region 151a (S860). Thereafter, the controller 180 may set a date (S865). More specifically, the controller 180 may set a date using a calendar menu or may allow a user to set a date and time.

Thereafter, the controller 180 may determine whether a bend signal is temporarily detected by the bend sensor 141 (S865). If there is no bend signal detected by the bend sensor 141, the operating method ends without modifying the screen image displayed in each of the first and second display regions 151a and 151b.

On the other hand, if a bend signal is temporarily detected by the bend sensor 141 and the bend signal indicates that there is a portion of the second display region 151b having the same display direction as that of the first display region 151a, the controller 180 may set a scheduled message sending function for the text message (S875) so that the text message can be transmitted on the date set in operation S865.

FIG. 15 illustrates diagrams for explaining the operating method of the first exemplary embodiment. If a bend signal is detected by the bend sensor 141 when a web page 900 is displayed in the entire first display region 151a, as shown in FIG. 15(a), the first display region 151a may be divided into left and right regions, as shown in FIG. 15(b). Thereafter, referring to FIG. 15(b), a web page 902 obtained by scaling down the web page 900 may be displayed in the left region of the first display region 151a, and a web page 904 obtained by reversing the web page 902 left to right may be displayed in the right region of the first display region 151a.

Figure 16:
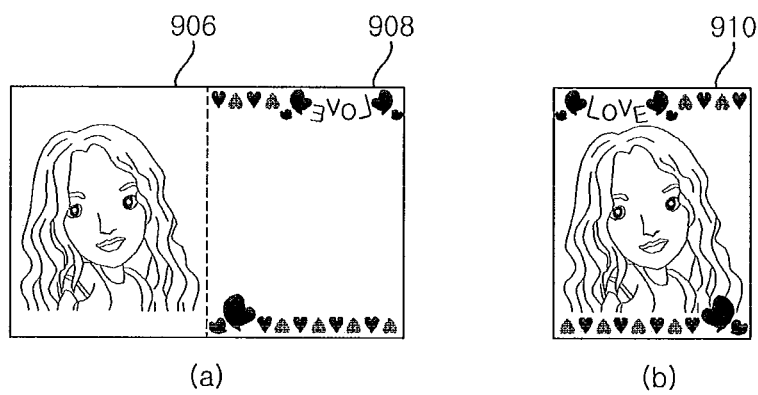
FIG. 16 illustrates diagrams for explaining the operating method of the second exemplary embodiment.

FIG. 16 illustrates diagrams for explaining the operating method of the second exemplary embodiment. If a bend signal is detected by the bend sensor 141 when a photo 906 and an image decoration screen 908 are displayed in the left and right regions, respectively, of the first display region 151a, as shown in FIG. 16(a), an image 910 obtained by combining the photo 906 and the image decoration screen 908 may be displayed in the second display region 151b having a display direction opposite to that of the first display region 151a.

FIG. 17 illustrates diagrams for explaining the operating method of the third exemplary embodiment. If a bend signal is detected by the bend sensor 141 when a movie play screen 912 is displayed in the first display region 151a, as shown in FIG. 17(a), subtitles 914 may be transparently displayed in the second display region 151b so that the movie play screen 912 can be seen therethrough.

Figure 18:
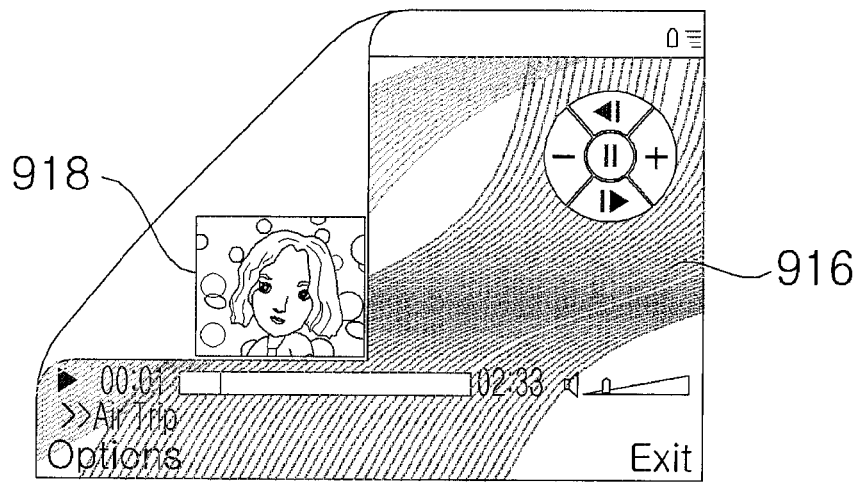
FIGS. 18 through 22 illustrate diagrams for explaining the operating method of the fourth exemplary embodiment.

FIGS. 18 through 22 illustrate diagrams for explaining the operating method of the fourth exemplary embodiment. Referring to FIG. 18, if a bend signal indicating that there is a portion of the second display region 151b having the same display direction as that of the first display region 151a is detected by the bend sensor 141 when a music play screen 916 is displayed in the first display region 151a, information regarding the music play screen 916, i.e., information 918 regarding a person related to music currently being played, may be opaquely displayed in the portion of the second display region 151b having the same display direction as that of the first display region 151a so as to be clearly distinguished from the music play screen 916.

Figure 19:
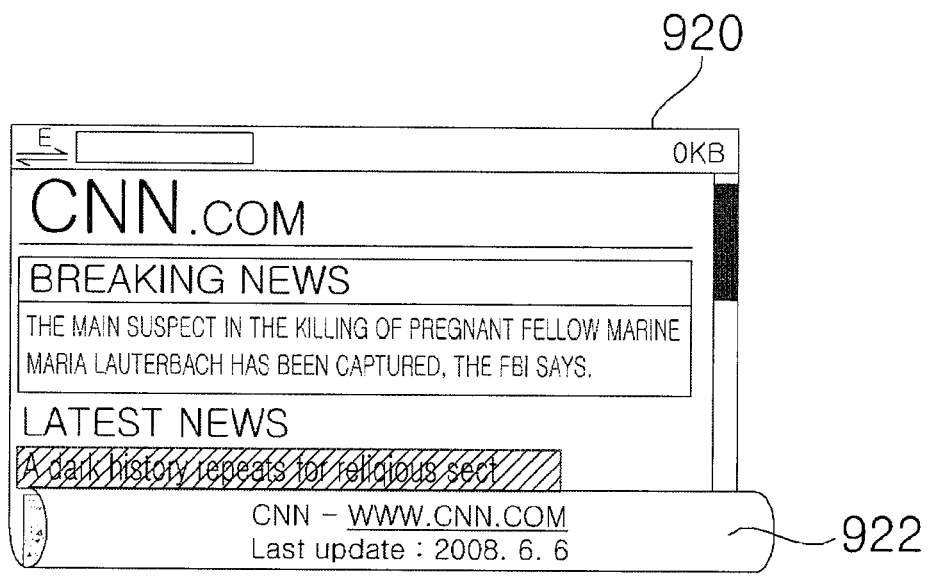
Figure 20:
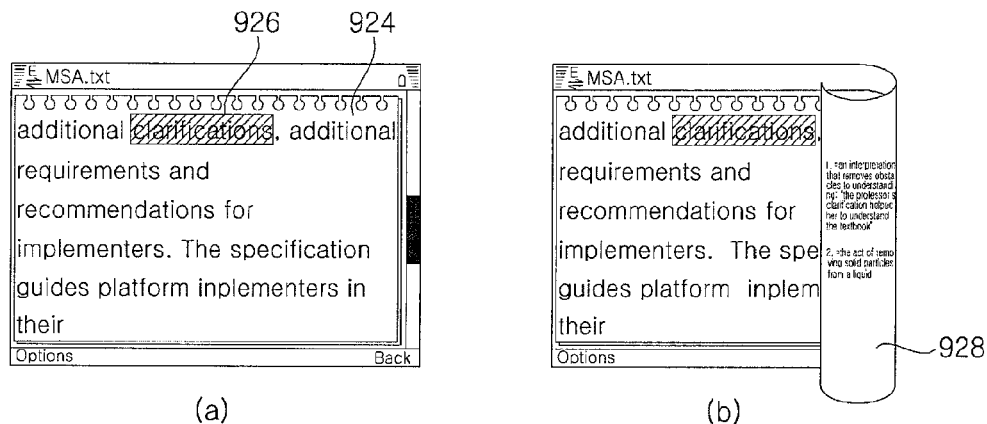
Figure 21:
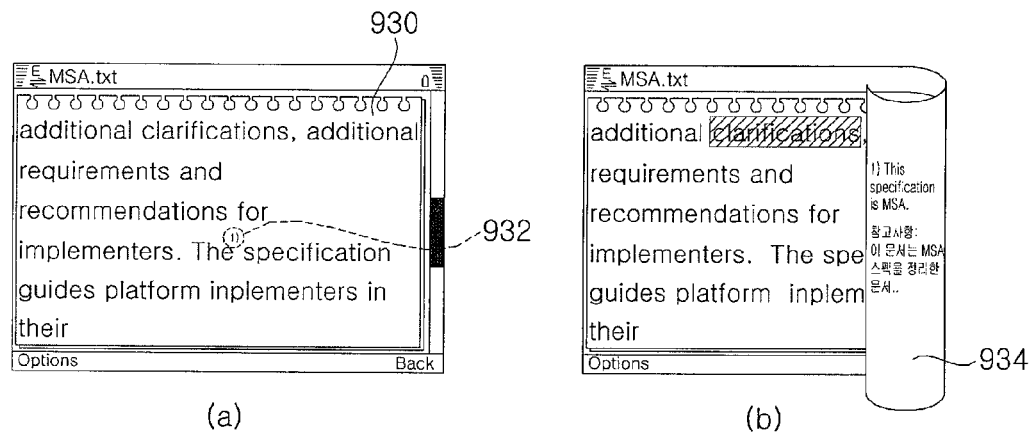
Figure 22:
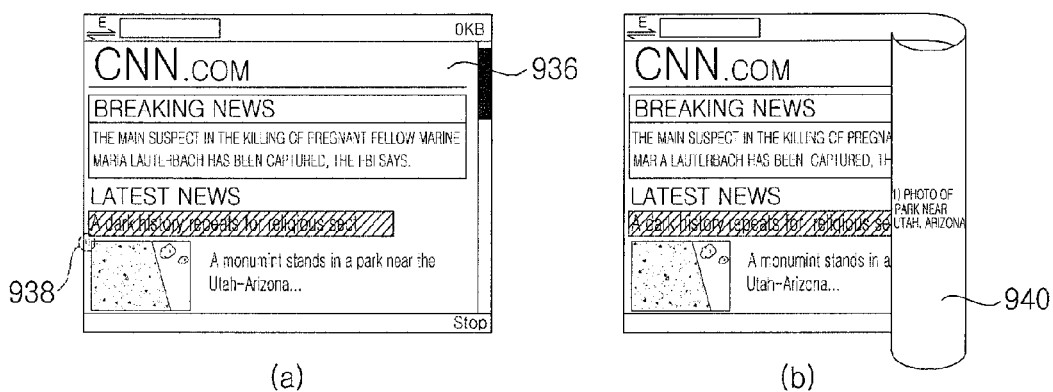

Referring to FIG. 19, if a bend signal indicating that there is a portion of the second display region 151b having the same display direction as that of the first display region 151a is detected by the bend sensor 141 when a web page 920 provided by a predetermined website is displayed in the first display region 151a, information regarding the predetermined website, i.e., title information and update information 922 of the predetermined website, may be displayed in the portion of the second display region 151b having the same display direction as that of the first display region 151a.

Referring to FIG. 20(a), if a document 924 is displayed in the first display region 151a and a word 926 is chosen from the document 924 in response to a user command, the color of the word 926 may be changed. Thereafter, if a bend signal indicating that there is a portion of the second display region 151b having the same display direction as that of the first display region 151a is detected by the bend sensor 141, information 928 indicating the definition of the word 926 may be displayed in the portion of the second display region 151b having the same display direction as that of the first display region 151a, as shown in FIG. 20(b). The information 928 may be displayed either transparently or opaquely.

If a bend signal indicating that there is a portion of the second display region 151b having the same display direction as that of the first display region 151a is detected by the bend sensor 141 when a document 930 including a footnote 932 is displayed in the first display region 151a, as shown in FIG. 20(a), a description 934 of the footnote 932 may be displayed in the portion of the second display region 151b having the same display direction as that of the first display region 151a, as shown in FIG. 21(b).

If a bend signal indicating that there is a portion of the second display region 151b having the same display direction as that of the first display region 151a is detected by the bend sensor 141 when a web page 936 including an image with an additional description mark 938 is displayed, as shown in FIG. 22(a), a detailed description 940 of the image may be displayed in the portion of the second display region 151b having the same display direction as that of the first display region 151a, as shown in FIG. 22(b).

Figure 23:
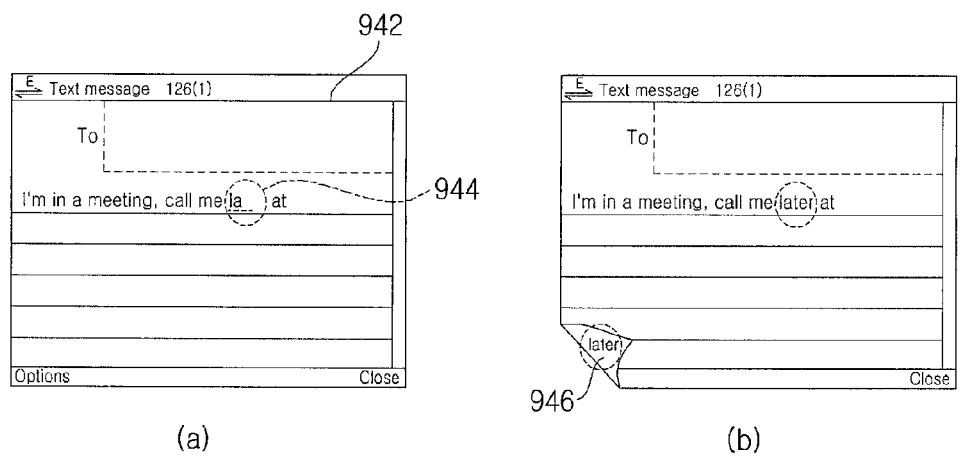
FIG. 23 illustrates diagrams for explaining the operating method of the fifth exemplary embodiment.

FIG. 23 illustrates diagrams for explaining the operating method of the fifth exemplary embodiment. Referring to FIG. 23(a), a character input window 942 may be displayed in the first display region 151a. If there is a typo in a word 944 input by a user, a typo alert may be output. Thereafter, if a bend signal indicating that there is a portion of the second display region 151b having the same display direction as that of the first display region 151a is detected by the bend sensor 141, a recommended word 946 for the word 944 may be displayed in the portion of the second display region 151b having the same display direction as that of the first display region 151a, as shown in FIG. 23(b). If the bend signal is detected for more than a predefined amount of time by the bend sensor 141, the word 944 may be replaced with the recommended word 946.

Figure 24:
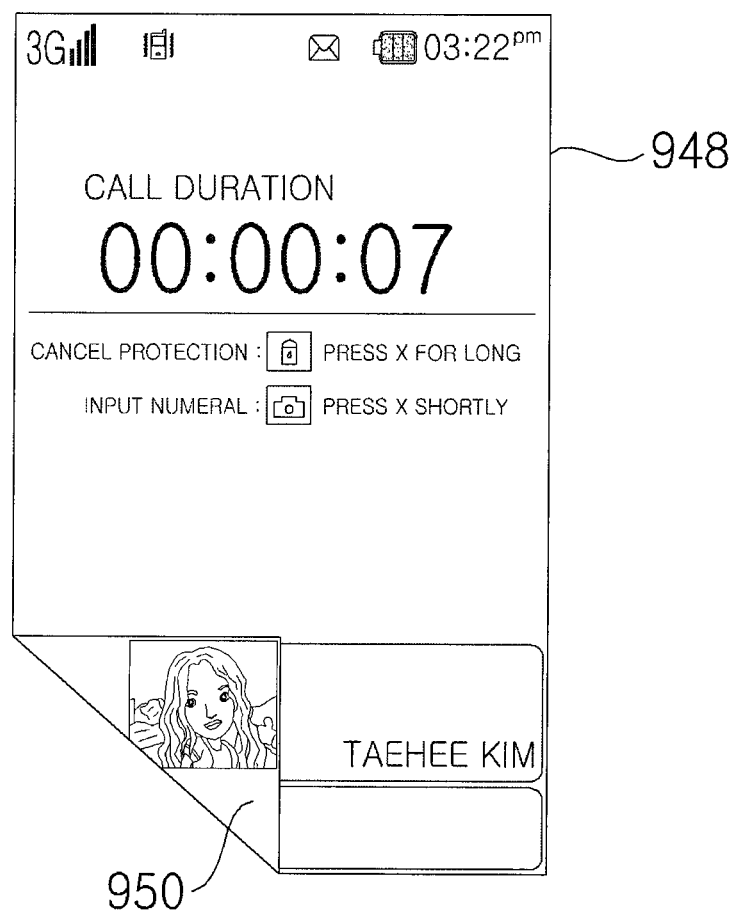
FIG. 24 illustrates diagrams for explaining the operating method of the sixth exemplary embodiment.

FIG. 24 illustrates diagrams for explaining the operating method of the sixth exemplary embodiment. If a bend signal indicating that there is a portion of the second display region 151b having the same display direction as that of the first display region 151a is detected by the bend sensor 141 when call information is displayed in the first display region 151a, a photo 950 of a caller or a callee may be displayed in the portion of the second display region 151b having the same display direction as that of the first display region 151a. The photo 950 may be displayed either transparently or opaquely.

Figure 25:
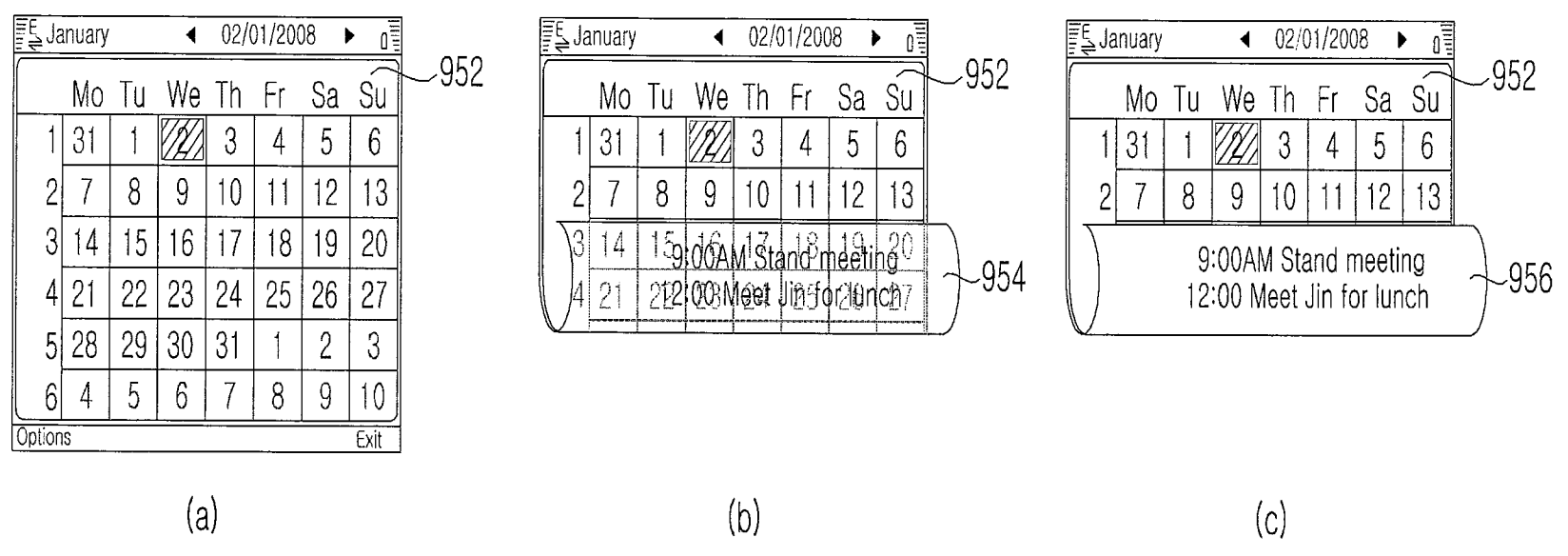
Figure 26:
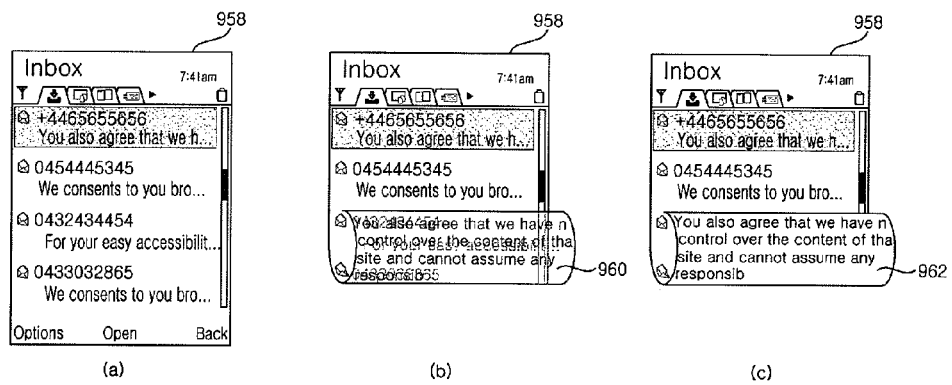
Figure 27:
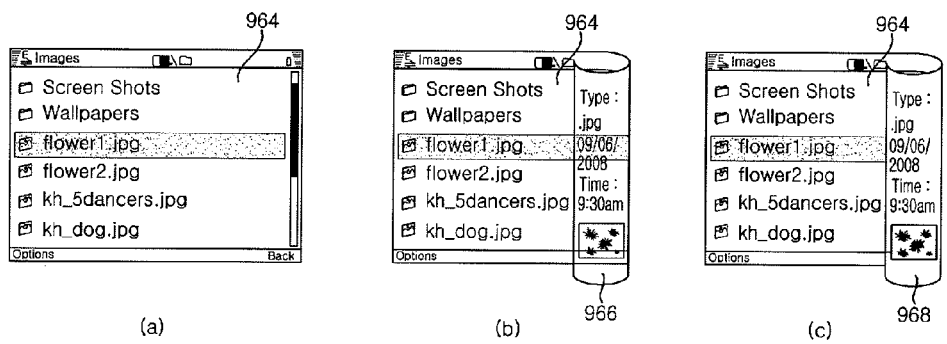

FIGS. 25 through 27 illustrate diagrams for explaining the operating method of the seventh exemplary embodiment.

Referring to FIG. 25(a), if a predetermined date is chosen from a calendar 952 displayed in the first display region 151a, the color of the chosen date in the calendar 952 may be changed. Thereafter, if a bend signal indicating that there is a portion of the second display region 151b having the same display direction as that of the first display region 151a is detected by the bend sensor 141, schedule information corresponding to the chosen date may be displayed in the portion of the second display region 151b having the same display direction as that of the first display region 151a, as shown in FIG. 25(b) or 25(c). More specifically, referring to FIG. 25(b), the schedule information 954 may be transparently displayed so that the calendar 958 can be seen therethrough. Alternatively, referring to FIG. 25(c), the schedule information 954 may be opaquely displayed so that the calendar 958 can be partially hidden from view, and that the schedule information 954 can be clearly distinguished from the calendar 958.

Referring to FIG. 26(a), a text message list 958 may be displayed in the first display region 151a, and one of a plurality of text messages included in the text message list 958 may be chosen. Thereafter, if a bend signal indicating that there is a portion of the second display region 151b having the same display direction as that of the first display region 151a is detected by the bend sensor 141, the content of the chosen text message may be displayed in the portion of the second display region 151b having the same display direction as that of the first display region 151a, as indicated by 960 of FIG. 26(b). The content of the chosen text message may be transparently displayed so that the text message list 958 can be seen therethrough. If the bend signal is detected for more than a predefined amount of time by the bend sensor 141, the content of the chosen text message may become opaque and may thus be able to be clearly distinguished from the text message list 958, as shown in FIG. 26(c).

Referring to FIG. 27(a), a file list 964 may be displayed in the first display region 151a, and one of a plurality of files included in the file list 964 may be chosen. Thereafter, if a bend signal indicating that there is a portion of the second display region 151b having the same display direction as that of the first display region 151a is detected by the bend sensor 141, information 966 regarding the chosen file may be displayed in the portion of the second display region 151b having the same display direction as that of the first display region 151a, as shown in FIG. 27(b). The information 966 may be transparently displayed so that the file list 958 can be seen therethrough. If the bend signal is detected for more than a predefined amount of time by the bend sensor 141, the information 966 may become opaque and may thus be able to be clearly distinguished from the file list 964, as shown in FIG. 27(c).

Figure 28:
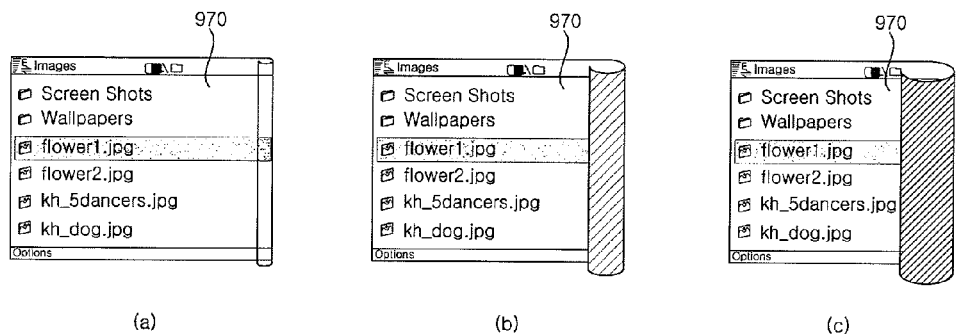
FIG. 28 illustrates diagrams for explaining the operating method of the eighth exemplary embodiment.

FIG. 28 illustrates diagrams for explaining the operating method of the eighth exemplary embodiment. If a bend signal indicating that there is a portion of the second display region 151b having the same display direction as that of the first display region 151a is detected by the bend sensor 141 when a file list 970 is displayed in the first display region 151a, as shown in FIG. 28(a), the portion of the second display region 151b having the same display direction as that of the first display region 151a may become transparent, and predetermined information may be displayed in the portion of the second display region 151b having the same display direction as that of the first display region 151a. If a bend signal indicating that the area of the portion of the second display region 151b having the same display direction as that of the first display region 151a has increased is detected by the bend sensor 141, the transparency of the portion of the second display region 151b having the same display direction as that of the first display region 151a may be reduced, as shown in FIG. 28(b). If a bend signal indicating that the area of the portion of the second display region 151b having the same display direction as that of the first display region 151a has increased beyond a predefined level is detected by the bend sensor 141, the portion of the second display region 151b having the same display direction as that of the first display region 151a may become completely opaque, as shown in FIG. 28(c).

Figure 29:
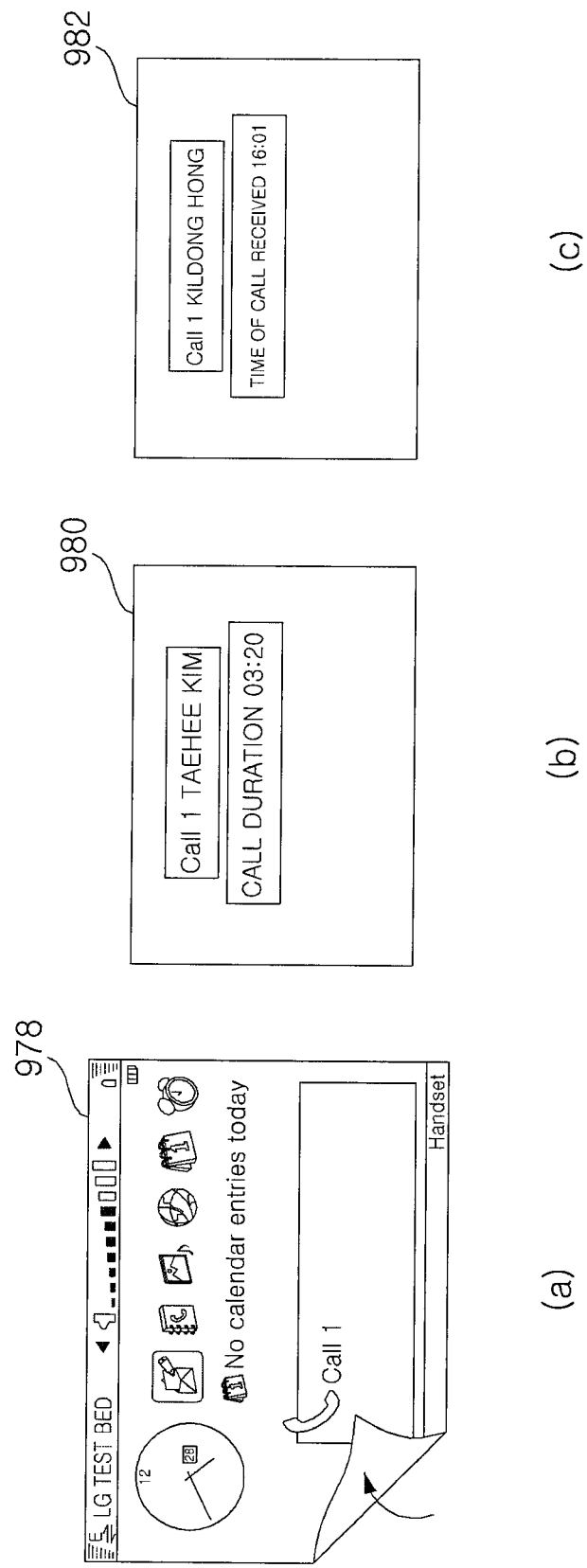
FIG. 29 illustrates diagrams for explaining the operating method of the ninth exemplary embodiment.

FIG. 29 illustrates diagrams for explaining the operating method of the ninth exemplary embodiment. If a bend signal is detected by the bend sensor 141 when a multi-call screen 978 is displayed in the first display region 151a, as shown in FIG. 29(a), caller/callee information and call duration information of a call currently being connected may be displayed in the first display region 151a, as indicated by reference numeral 980 of FIG. 29(b), and caller information of a call that is put on hold and time information indicating since when the call is put on hold may be displayed in the second display region 151b, as indicated by reference numeral 982 of FIG. 29(c).

Figure 30:
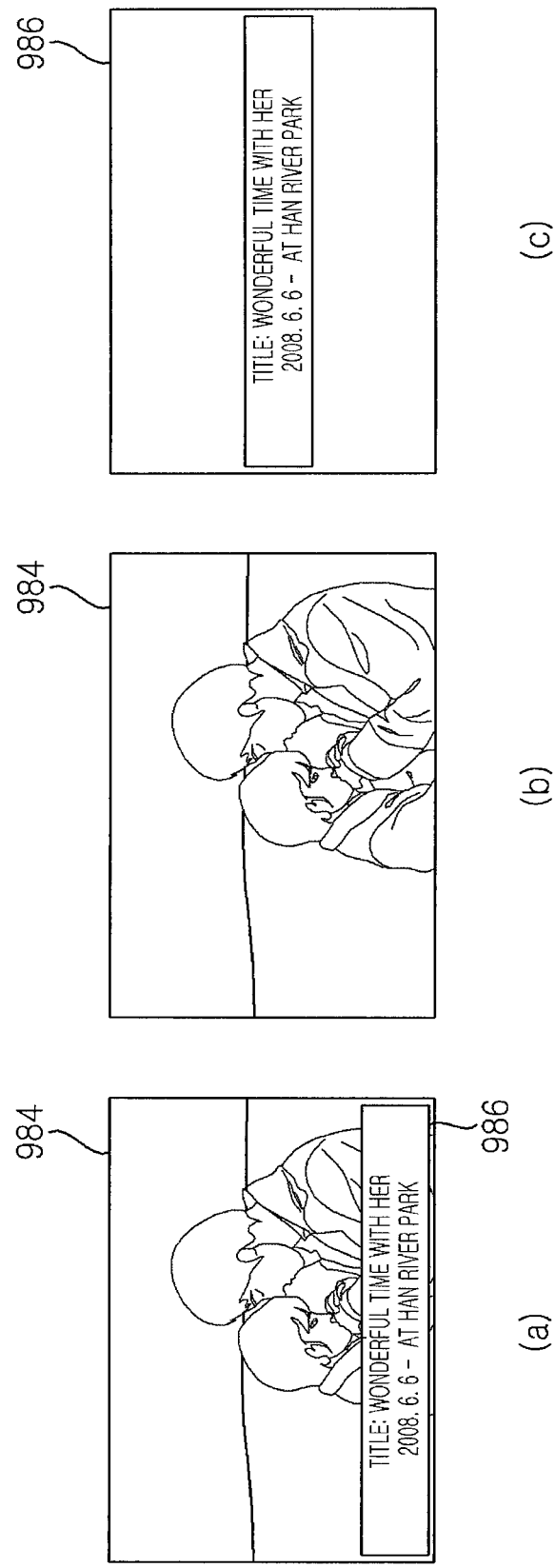
FIG. 30 illustrates diagrams for explaining the operating method of the tenth exemplary embodiment.

FIG. 30 illustrates diagrams for explaining the operating method of the tenth exemplary embodiment. If a bend signal is detected by the bend sensor 141 when a photo 984 and a photo title 986 are displayed in the first display region 151a, the photo 984 may be displayed in the first display region 151a, as shown in FIG. 30(b), and the photo title 986 may be displayed in the second display region 151b, as shown in FIG. 30(c).

Figure 31:
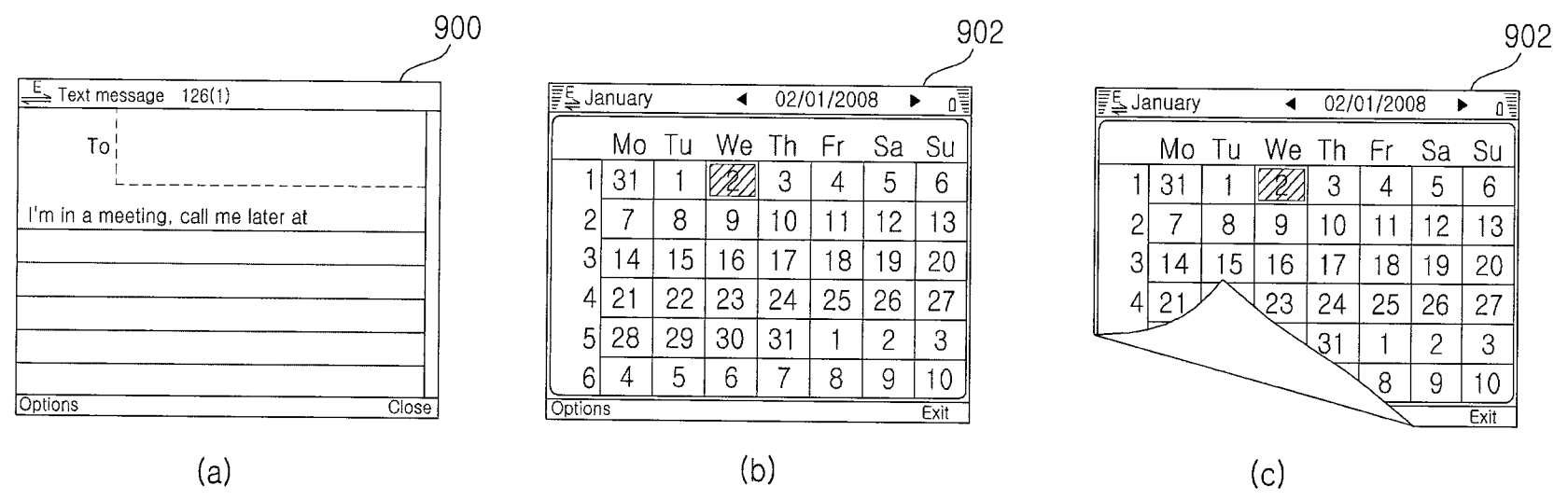

FIG. 31 illustrates diagrams for explaining the operating method of the eleventh exemplary embodiment. Referring to FIG. 31(a), a text message 900 may be drafted in response to a user command. Thereafter, referring to FIG. 31(b), a date may be chosen from a calendar 902. Thereafter, if a bend signal is detected by the bend sensor 141, a scheduled message sending function may be set for the text message 900 so that the text message 900 can be transmitted on the chosen date.

The mobile terminal according to the present invention and the operating method of the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An operating method of a mobile terminal having a transparent flexible display, the transparent flexible display including a first display region located at a front portion of the transparent flexible display and a second display region located at a rear portion of the transparent flexible display, the operating method comprising:
if a combination image menu is chosen, dividing the first display region into first and second regions;
displaying a first image in the first region, and displaying a reversed version of a second image in the second region; and
if a bend signal is detected, displaying a combination image combining the first image and the second image in the second display region.

2. The operating method of claim 1, wherein the first and second regions are left and right regions of the first display region.

3. An operating method of a mobile terminal having a transparent flexible display, the transparent flexible display including a first display region located at a front portion of the transparent flexible display and a second display region located at a rear portion of the transparent flexible display, the operating method comprising:
if the mobile terminal is in a multi-call state, displaying a multi-call screen in the first display region; and
if a bend signal is detected, displaying call information regarding a first call currently being connected in the first display region, and displaying call information regarding a second call rejected or put on hold in the second display region.

4. An operating method of a mobile terminal having a transparent flexible display, the transparent flexible display including a first display region located at a front portion of the transparent flexible display and a second display region located at a rear portion of the transparent flexible display, the operating method comprising:
displaying a plurality of images in the first display region;
determining whether a bend signal, indicating that the transparent flexible display is bent, is detected; and
upon choosing one of the plurality of images and upon determining that a portion of the second display region has a same display direction as a display direction of the first display region, changing the transparency of the portion of the second display region having the same display direction as the same display direction of the first display region and displaying information regarding the chosen image in the portion of the second display region having the same display direction as the same display direction of the first display region, wherein the changing the transparency is according to an area of the portion of the second display region having the same display direction as the same display direction of the first display region, and wherein, if the area of the portion of the second display region having the same display direction as that of the first display region exceeds a predefined level, the portion of the second display region having the same display direction as that of the first display region changes to opaque.

5. The operating method of claim 4, wherein the plurality of images include at least one of a file list, a text message list, and a list of dates.

6. A mobile terminal, comprising:
a flexible display configured to be transparent and have a first display region at a front portion of the flexible display and a second display region at a rear portion of the flexible display; and
a controller configured to
divide the first display region into first and second regions if a combination image menu is chosen,
display a first image in the first region, and displaying a reversed version of a second image in the second region, and
if a bend signal is detected, display a combination image combining the first image and the second image in the second display region.

7. The mobile terminal of claim 6, wherein the first and second regions are left and right regions of the first display region.

8. A mobile terminal, comprising:
a flexible display configured to be transparent and have a first display region at a front portion of the flexible display and a second display region at a rear portion of the flexible display; and
a controller configured to
display a multi-call screen in the first display region if the mobile terminal is in a multi-call state, and
if a bend signal is detected, display call information regarding a first call currently being connected in the first display region, and display call information regarding a second call rejected or put on hold in the second display region.

9. The mobile terminal of claim 8, wherein the image includes at least one of a music file play screen, a web page, a photo, a note, and an additional description mark displayed in a web page, a footnote to text, and a word chosen in response to a user command.

10. A mobile terminal, comprising:
a flexible display configured to be transparent and have a first display region at a front portion of the flexible display and a second display region at a rear portion of the flexible display; and
a controller configured to
display a plurality of images in the first display region,
determine whether a bend signal indicating that the flexible display is bent is detected, and
if one of the images is chosen and upon determining that a portion of the second display region has a same display direction as a display direction of the first display region, change the transparency of the portion of the second display region having the same display direction as the same display direction of the first display region and display information regarding the chosen image in the portion of the second display region having the same display direction as the display direction of the first display region,
wherein the controller is configured to change the transparency according to an area of the portion of the second display region having the same display direction as the same display direction of the first display region, and
wherein, if the area of the portion of the second display region having the same display direction as that of the first display region exceeds a predefined level, the controller is configured to opaque the portion of the second display region having the same display direction as that of the first display region.

11. The mobile terminal of claim 10, wherein the images include at least one of a file list, a text message list, and a list of dates.

* * * * *